US012332861B2

(12) United States Patent
Perkov

(10) Patent No.: US 12,332,861 B2
(45) Date of Patent: Jun. 17, 2025

(54) COMPUTING SIMILARITY OF TREE DATA STRUCTURES USING METRIC FUNCTIONS DEFINED ON SETS

(71) Applicant: Oracle International Corporation, Redwood Shores, CA (US)

(72) Inventor: Eugene Perkov, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2 days.

(21) Appl. No.: 17/834,846

(22) Filed: Jun. 7, 2022

(65) Prior Publication Data

US 2023/0394021 A1     Dec. 7, 2023

(51) Int. Cl.
*G06F 16/22* (2019.01)
*G06F 16/242* (2019.01)

(52) U.S. Cl.
CPC ...... *G06F 16/2246* (2019.01); *G06F 16/2282* (2019.01); *G06F 16/2445* (2019.01)

(58) Field of Classification Search
CPC ............. G06F 16/2246; G06F 16/2282; G06F 16/2445
See application file for complete search history.

(56) References Cited

U.S. PATENT DOCUMENTS

| | | | |
|---|---|---|---|
| 6,240,188 B1 | 5/2001 | Dondeti | |
| 8,639,509 B2 * | 1/2014 | Weng | G10L 15/1822 |
| | | | 704/251 |
| 2002/0046394 A1 * | 4/2002 | Do | G06F 8/20 |
| | | | 717/108 |
| 2002/0123984 A1 * | 9/2002 | Prakash | G06F 8/34 |
| 2003/0009474 A1 | 1/2003 | Hyland | |
| 2003/0182272 A1 * | 9/2003 | Leung | G06F 16/2246 |
| 2003/0208495 A1 | 11/2003 | Andreev | |

(Continued)

FOREIGN PATENT DOCUMENTS

| | | | |
|---|---|---|---|
| CN | 102841901 A | * | 12/2012 |
| CN | 103986498 A | * | 8/2014 |

(Continued)

OTHER PUBLICATIONS

Fekete et al., A Serialization Graph Construction for Nested Transactions ACM, 1990. (Year: 1990).*

(Continued)

*Primary Examiner* — Neveen Abel Jalil
*Assistant Examiner* — Hubert Cheung
(74) *Attorney, Agent, or Firm* — Trellis IP Law Group, PC

(57) ABSTRACT

Example embodiments facilitate efficient comparison operations of tree structures, resulting in comparison metrics (e.g., similarity or distance metrics or scores) used enhance software systems, such as search algorithms, code optimization software, enterprise database applications, and so on. Trees to be compared are converted into sets, i.e., serialized using a novel enumeration method. Metric functions can then be efficiently applied to the sets to facilitate the comparison operations. In an illustrative embodiment, subtrees of larger trees can be compared individually, pairwise, where the comparison results of the subtree comparisons can be selectively weighted and summed to yield an aggregated comparison metric that is tailored for a specific application or comparison priority.

20 Claims, 22 Drawing Sheets

(56) References Cited

U.S. PATENT DOCUMENTS

| | | | | |
|---|---|---|---|---|
| 2005/0065954 | A1* | 3/2005 | Baratange | G06F 16/2246 |
| 2007/0179966 | A1* | 8/2007 | Li | G06F 16/2465 |
| | | | | 707/999.102 |
| 2007/0185896 | A1* | 8/2007 | Jagannath | G06F 18/24323 |
| | | | | 707/999.102 |
| 2008/0139191 | A1* | 6/2008 | Melnyk | H04L 67/565 |
| | | | | 707/E17.121 |
| 2009/0030686 | A1* | 1/2009 | Weng | G10L 15/1822 |
| | | | | 704/E15.001 |
| 2009/0222473 | A1* | 9/2009 | Chowdhury | G06F 16/9027 |
| | | | | 707/999.102 |
| 2014/0101208 | A1* | 4/2014 | Hsiao | G06F 3/017 |
| | | | | 707/805 |
| 2016/0335303 | A1* | 11/2016 | Madhalam | G06F 16/2455 |
| 2017/0316041 | A1 | 11/2017 | Delaney | |
| 2018/0232404 | A1* | 8/2018 | Bhatti | G06F 16/9024 |
| 2019/0004874 | A1* | 1/2019 | Pahlavan Yali | G06F 40/143 |
| 2019/0317940 | A1* | 10/2019 | Bauer | G06F 16/24561 |
| 2020/0081934 | A1* | 3/2020 | Karwan | H04L 67/306 |
| 2020/0327118 | A1* | 10/2020 | Ahmed | G06N 3/08 |
| 2021/0191919 | A1* | 6/2021 | Perkov | G06F 16/288 |
| 2022/0107799 | A1* | 4/2022 | Wu | G06N 20/00 |
| 2022/0197917 | A1* | 6/2022 | Schneuwly | G06N 20/00 |
| 2023/0098447 | A1* | 3/2023 | Raza | G06F 9/505 |
| | | | | 718/105 |

FOREIGN PATENT DOCUMENTS

| | | | | |
|---|---|---|---|---|
| CN | 103106313 | B * | 9/2015 | |
| CN | 105843907 | A * | 8/2016 | |
| CN | 108268548 | A * | 7/2018 | |
| CN | 110162478 | A * | 8/2019 | G06F 11/3688 |
| CN | 110175128 | A * | 8/2019 | G06F 11/3604 |
| CN | 111274242 | A * | 6/2020 | G06F 16/2246 |
| CN | 111931181 | A * | 11/2020 | G06F 21/563 |
| CN | 112256690 | A * | 1/2021 | G06F 16/2246 |
| CN | 112783505 | A * | 5/2021 | G06F 8/427 |
| CN | 114546410 | A * | 5/2022 | |
| CN | 115481854 | A * | 12/2022 | |
| CN | 113111090 | B * | 1/2023 | G06F 16/2246 |
| CN | 110175585 | B * | 1/2024 | G06F 17/2705 |
| CN | 113138767 | B * | 4/2024 | G06F 8/42 |
| KR | 102096017 | B1 * | 4/2020 | |
| WO | WO-2016194909 | A1 * | 12/2016 | G06F 16/00 |

OTHER PUBLICATIONS

Uri Alon, Meital Zilberstein, Omer Levy, and Eran Yahav. 2019. code2vec: Learning Distributed Representations of Code. Proc. ACMProgram. Lang. 3, POPL, Article 40 (Jan. 2019), 29 pages. https://doi.org/10.1145/3290353 (Year: 2019).*

White et al., Deep Learning Code Fragments for Code Clone Detection, ASE'16, Sep. 3-7, 2016, Singapore, Singapore c 2016 ACM.ISBN978-1-4503-3845-5/16/09 DOI: http://dx.doi.org/10.1145/2970276.2970326 (Year: 2016).*

Ul Ain et al., A Systematic Review on Code Clone Detection, IEEE Access, May 22, 2019, Digital Object Identifier 10.1109/ACCESS.2019.2918202 (Year: 2019).*

Shankar Pal. Istvan Cseri et al. Indexing XML Data Stored In a Relational Database; Microsoft Corporation; Redmond Washington, USA; 12 pages.

"Method of Using Path Encoding and Relational Set Operations for Search and Comparison in Hierarchies and Trees," by Eugene Perkov, 40 pages.

"Additional Details," 3 pages.

"Oracle SQL Pattern Analysis," Eugene Perkov, 10 pages.

K. Horadam and M. Nyblom, Distances between sets based on set commonality<https://www.sciencedirect.com/science/article/pii/S0166218X13004800>, vol. 167. Elsevier, 2014.

* cited by examiner

| Query 1 ~214 | Query 2 ~224 |
|---|---|
| SELECT<br>E. EMPLOYEE_ID,<br>E. EMPLOYEE_NAME,<br>D. DEPT_NAME ~216 | SELECT<br>D. DEPT_NAME,<br>E. EMPLOYEE_ID,<br>E. EMPLOYEE_NAME ~226 |
| FROM<br>EMPLOYEES E,<br>DEPARTMENTS D ~218 | FROM<br>DEPARTMENTS D,<br>EMPLOYEES E ~228 |
| WHERE<br>E. DEPT_ID = D.ID ~220 | WHERE<br>D.NAME LIKE 'FIN%' ~230 |
| AND<br>D.NAME LIKE 'FIN%' | AND<br>D.ID = E.DEPT ID |

Weights for Query Block Types ~280

| Clause ~282 | Inline Views ~284 | UNION Blocks ~286 | Scalar Subqueries ~288 |
|---|---|---|---|
| SELECT Clause | 0.5 | 0.5 | 0 |
| FROM Clause | 0.5 | 0.5 | 0.5 |
| WHERE Clause | 0 | 0 | 0.5 |

FIG. 14

| Trees Used ↙302 | Computation Distance ↙304 | Threshold Value ↙306 | Pass or Fail ↙308 |
|---|---|---|---|
| Entire trees | 0.3583 | 0.3000 | FAIL |
| SELECT subtrees | 0.1429 | 0.3000 | PASS |
| FROM subtrees | 0.2000 | 0.3000 | PASS |
| WHERE subtrees | 0.4222 | 0.3000 | FAIL |

COMPUTING SIMILARITY OF TREE DATA STRUCTURES USING METRIC FUNCTIONS DEFINED ON SETS

CROSS REFERENCES TO RELATED APPLICATIONS

This application is related to the following application, U.S. patent application Ser. No. 16/808,152 entitled USING PATH ENCODING METHOD AND RELATIONAL SET OPERATIONS FOR SEARCH AND COMPARISON OF HIERARCHICAL STRUCTURES, filed Mar. 3, 2020 (ORACP0257/ORA200267-US-NP), which is hereby incorporated by reference as if set forth in full in this application for all purposes.

BACKGROUND

The present application relates to computing, and more specifically, to software, systems, and accompanying methods and mechanisms for facilitating performing computing operations using data stored in hierarchal tree structures using estimates of similarities or distances between the hierarchical tree structures.

Systems and methods that leverage similarities of hierarchical tree structures to facilitate computing operations are employed in various demanding applications, including enterprise software, Artificial Intelligence (AI) and associated neural networks, computer code analyzers and optimizers, search algorithms, genetic analysis software, computing resource allocation mechanisms, data visualization software (e.g., for finding and retrieving data for pie charts, sunbursts, pivot grids, hypercubes, etc.) and so on. Such applications often demand efficient high-performance mechanisms that can identify, estimate, and quantify specific types of tree similarities, differences, and so on.

However, when using conventional tree-comparison and/or tree-distance computation algorithms or functions, certain types of tree similarities can be problematically obscured among the associated structures and data, and the comparison operations can be prohibitively slow and computing-resource intensive.

SUMMARY

Generally, embodiments relate to a method and/or system for efficiently comparing tree structures to extract information indicative of how similar (and/or different) the tree structures are, as it pertains to a sought metric and/or specific aspect or property to be compared. This information can then be used in other software systems, e.g., search algorithms, code-optimization systems, and so on, to enhance efficiencies, provide insights to facilitate informed decision making, and so on.

Example embodiments use an enumeration method (e.g., an example method of which is discussed more fully in the above-identified and incorporated U.S. Patent, entitled USING PATH ENCODING METHOD AND RELATIONAL SET OPERATIONS FOR SEARCH AND COMPARISON OF HIERARCHICAL STRUCTURES) to serialize the tree structures, thereby converting them into mathematical sets, whereby fast and efficient mathematical set operations can then be performed on the sets. The set operations include metric functions to ascertain tree similarities or distances. Different metric functions can be used to operate on the sets, depending upon what type of similarity or "distance" is being analyzed.

During tree serialization, trees may be converted into special trees, where the ordering of sibling nodes is immaterial (e.g., where sibling node ordering information in the initial tree may be removed, ignored, or otherwise redefined), which may facilitate identifying similarities between trees and/or subtrees, despite differences in the order of sibling nodes (of the trees being compared) on a given level or sub-level of the trees. This can be particularly important for code optimization applications, where similar hierarchically structured code can now be readily identified, despite differences in arrangements in which code clauses, statements, and/or fragments are ordered in a given function, procedure, computing object, etc.

Accordingly, various embodiments may provide an operational framework for tree comparison operations, where the framework may accommodate arbitrary data types and algorithms needed to solve a particular problem. Representation of the trees as sets facilitates applying metric functions defined on those sets to rapidly and efficiently compute tree similarities and distances.

Furthermore, certain embodiments can provide detailed tree-comparison operations in accordance with predetermined priorities. To effectuate such operations, subtrees of different trees can be compared individually, e.g., pairwise, and the results of the individual pairwise comparisons may be scaled in accordance with importance or priority (e.g., via importance weights). Note that for certain scientific or technical problems, some parts of trees, or some aspects of the trees, may be more or less important than the others. Furthermore, different subtree comparisons may call for use of different metric functions.

A given subtree of a first tree can be compared to each corresponding subtree of a second tree. This can be done using one or more metric functions, and the operation can be assigned or associated with one or more importance weights. Multiple comparison operations using similar or different metrics for multiple subtree comparisons can be further combined, e.g., via a linear combination, to generate a combined comparison metric that accounts for different priorities of a given overall tree comparison operation.

Accordingly, certain embodiments may compare pairwise distances or similarity scores between forests of weighted trees. This may significantly improve comparison results for a particular task, as the results can be tailored, via the importance weights, in accordance with the priorities of the particular task.

An example method for facilitating determining similarities among hierarchically structured data, i.e., trees, includes using an enumeration method to serialize a first tree and a second tree, resulting in a first set representation of the first tree and a second set representation of the second tree, respectively; applying one or more metric functions using the first set representation and the second set representation as inputs to the one or more metric functions, resulting in one or more tree-similarity metrics as output of the one or more metric functions; and selectively providing the one or more tree-similarity metrics to one or more software systems.

In more specific embodiments, the one or more software systems include server-side software. e.g., Artificial Intelligence (AI) engine(s), software development environments, enterprise software, such as business intelligence and/or customer relationship management software, etc., of a cloud-based computing environment.

In a particular specific embodiment, tree-comparison methods discussed herein are incorporated into (or otherwise used by) a software analyzer, usable to analyze Structured Query Language (SQL) code. The analysis results may then be used in a code optimizer to facilitate optimizing the code. The code optimization may be automated and/or may simply illustrate (to a software developer) candidate code fragments (e.g., functions, procedures, classes, etc.) for optimization, e.g., consolidation into one or more efficient reusable code sections.

The code optimizer may include computer code for facilitating conducting searches of other computer code, so as to detect and illustrate code structures that exhibit one or more of the tree-similarity metrics within a predetermined threshold range.

The tree serializing step may include constructing a bitwise representation of a first structure of the first tree and a second structure of the second tree; and then using the bitwise representations of the first structure and the second structure to generate the first set representation and the second set representation, respectively.

A further understanding of the nature and the advantages of particular embodiments disclosed herein may be realized by reference of the remaining portions of the specification and the attached drawings.

BRIEF DESCRIPTION OF THE DRAWINGS

FIG. 11 illustrates example computer-code defining queries, which may be considered trees for the purposes of comparison in accordance with various embodiments discussed herein.

FIG. 14 illustrates a first example table with example weights to be applied to different types of clauses of a particular set of computer code, e.g., Structured Query Language (SQL) code.

FIG. 15 illustrates a second example table, with results of comparison calculations, e.g., similarity scores or distance computations, based on the weights of FIG. 14 and in accordance with a predetermined metric function.

DETAILED DESCRIPTION OF EMBODIMENTS

Figure 1:
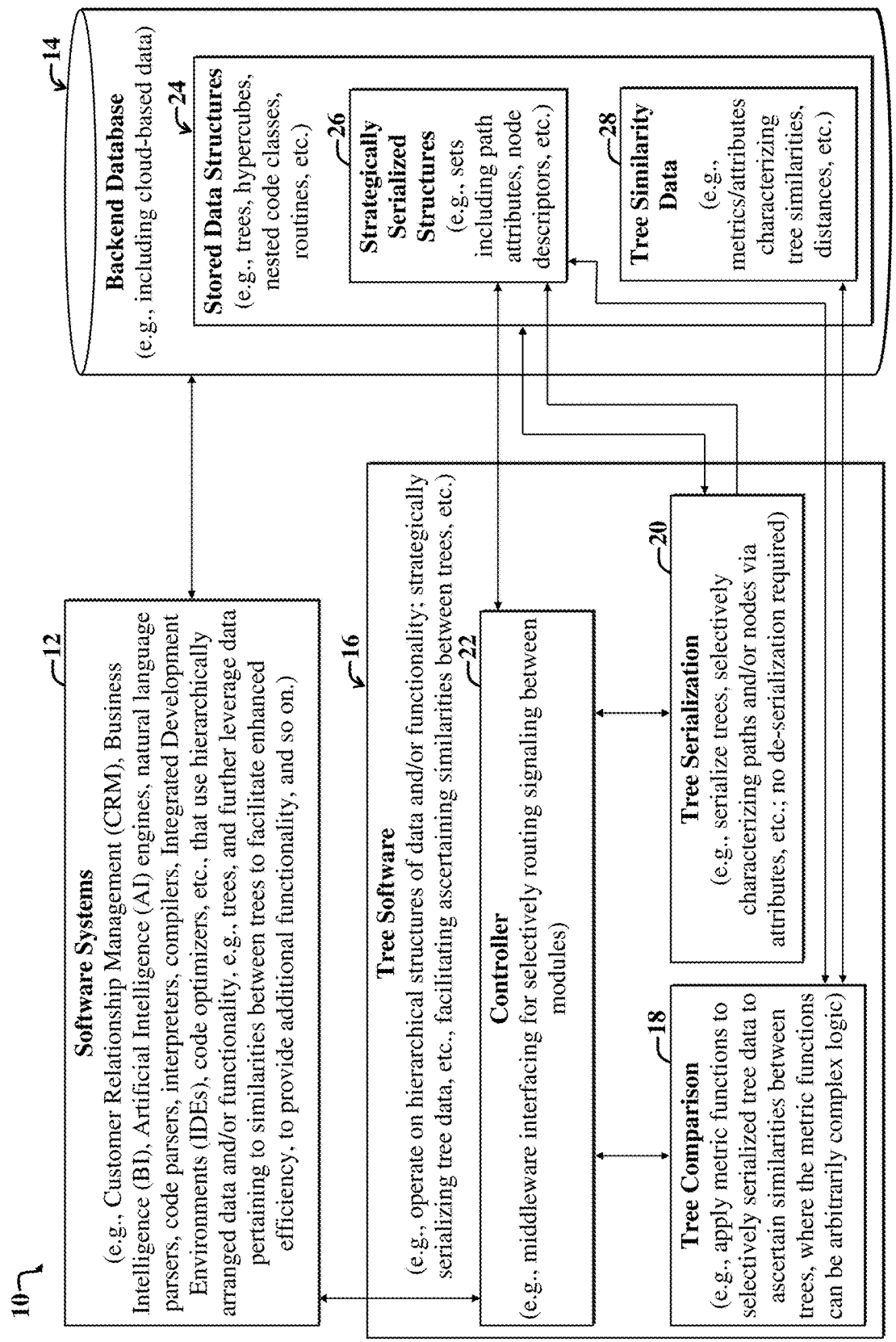
FIG. 1 illustrates a first example system and accompanying computing environment employing specialized tree software, including a tree serialization module and a tree comparing module, for selectively serializing trees and using set operations to facilitate comparison operations, the results of which are used to enhance the efficiency and functionality of software systems.

Note that, generally, use of trees is widespread throughout, business, government, universities, other organizations, and throughout scientific and technical fields (e.g., computer science technology, engineering, and math). Accordingly, various embodiments discussed herein may be widely applicable to a broad range of applications.

Example applications include code parsers, natural language parsers for Artificial Intelligence (AI) applications, Just-In-Time (JIT) compilation systems, automated code optimization systems, static code analyzers, semantic patterns processors, advanced search engines (e.g., enterprise search engines for locating Bill of Materials), Computer Aided Design (CAD) software, Customer Relationship Management (CRM) platforms, cloud-based Integrated Development Environments (IDEs), and so on.

Certain embodiments can provide efficient, flexible, high-performance mechanisms for not just providing accurate estimates and/or metrics indicating structural similarities between hierarchical tree structures, but similarities between data payloads and types (of data in the tree nodes) and similarities or distances between subtree structures or components of different tree structures. Accordingly, certain embodiments can readily account for the varying nature of the trees, including directed or undirected trees, as discussed more fully below.

For the purposes of the present discussion, a tree may be any data structure characterized by one or more hierarchies. A hierarchy may be any arrangement of data, where different data in the arrangement may exhibit superior or subordinate relationships with other data.

A tree hierarchy may be a hierarchy characterized by a group of related nodes, e.g., related by attributes, dimensions, labels, data objects, etc., which may be arranged in levels, where higher levels are characterized by nodes that exhibit superior relationships relative to nodes of lower levels. Higher level nodes are called parents, grandparents, etc., of related lower level nodes, e.g., child nodes, grandchild nodes, and so on.

A tree hierarchy, also called a tree structure herein, may exhibit nodes corresponding to data dimensions and/or leaf data. Leaf data may represent data of the lowest level node (called a leaf node) along any branch of the tree structure, such that the leaf node lacks any child nodes.

The entire structure of the tree hierarchy can represent a collection of branches. A branch may be any path of the structure between nodes. Generally, the branches discussed herein represent paths from a top level or parent node to sub-nodes, e.g., child nodes, grandchild nodes, and so on. Nodes at the same level of a hierarchy and having the same parent are called sibling nodes herein.

Depending upon the context in which the terms tree and hierarchy are employed, a tree may refer to both the hierarchy describing the tree and the data in the tree. The term hierarchy may refer to the particular structure or architecture of the tree. However, in certain instances, a particular tree may be referred to by the nature of its structure, i.e., its hierarchy. Furthermore, in certain contexts herein, the terms tree and tree structure are employed interchangeably to refer to both the hierarchical structure of a given tree and the data stored therein or maintained in association with nodes thereof.

Tree hierarchies, also called data hierarchies herein, may be categorized as explicit and/or implicit hierarchies. Explicit hierarchical representations of data are organized according to hierarchical relationships inherent within the data. Such hierarchical relationships are often based on persistent data attributes characterizing the data. An example of an extrinsic hierarchy includes information about cities arranged by country, state, county, and so on.

Another example may be a human resources hierarchy, which depicts a corporate structure, where employees are subordinate to project managers, which are subordinate to regional directors, and so on. In general, explicit hierarchies are defined and maintained irrespective of the visualization technique used to display the data.

Data manipulations, such as searching for, and performing operations on or with specified sub-hierarchies (subtrees) inside larger hierarchies (trees) can be a computationally difficult problem. The sizes of the trees and subtrees, along with the complexity of the structures; the desire to return a result quickly; and other factors, require that the tree structures and their operations be implemented efficiently.

Embodiments discussed herein enable efficient implementation of computing tasks, such as searching for patterns in subtrees, via relational databases. Other computing tasks include, for example, implementing various database operations on tree structures; operations such as computing distance metrics or tree-similarity metrics. Embodiments discussed herein facilitate optimizing such operations for speed and computing-resource consumption efficiency.

For the purposes of the present discussion, an implicit hierarchical representation, i.e., implicit hierarchy, may refer to an organization of data and relationships that is user instantiated by choices made to display and/or analyze the data. Hence, certain implicit hierarchies may be implied from the way that users classify and summarize detailed amounts or metrics by different data dimensions on reports and analytics. Each level of an implicit hierarchy may correspond to a data dimension displayed in a report or analytic. A data dimension may be any category or classification of an amount or category. For example, columns of a table may represent data dimensions.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

Software functionality may be any function, capability, or feature, e.g., stored or arranged data, that is provided via computer code, i.e., software. Generally, software functionality may be accessible via use of a user interface, and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

For the purposes of the present discussion, multi-dimensional data may be any data that can be partitioned by interrelated groupings or categories. A data dimension, often simply called "dimension," may be any category, such as an amount category, used to group or categorize data.

A data level may be any categorization of data of a given dimension. For example, data that includes a location dimension may include different data levels associated with state, county, city, and so on. Such data levels may represent an extrinsic sub-hierarchy of an intrinsic hierarchy that includes the location dimension. In general, extrinsic hierarchies include various data levels, while intrinsic hierarchies may include several dimensions that may include different data levels.

In certain embodiments discussed herein, trees (also called tree structures herein) that define a hierarchical structure characterizing data can be created by a human user such as an administrator. Different utilities may be provided, such as TreeManager® in the PeopleSoft® suite of software products, which can allow a user to define trees or other hierarchies. Once defined, the tree can be applied to data to allow viewing of the data in accordance with the tree hierarchy. For example, spending accounts for each department in a large company can be organized according to the tree structure of the departments within the organization.

In certain embodiments discussed herein, tree structures may be employed to represent data dimensions and/or groups of data dimensions. For example, a given travel authorization dimension may include a travel detail dimension, a destination dimension, report date, expense amount, and so on.

The dimensions may include subcategories or attributes. For example, the destination dimension may include names of cities, e.g., Bangalore, Dallas, etc. The report date dimension may include attributes, e.g., specific dates corresponding to a particular report date. Similarly, the expense amount dimension may include leaf data identifying a particular cost or expense associated with a particular travel detail dimension, of which the expense amount is a sub-dimension or node.

For the purposes of the present discussion, a data search may be any process whereby a selection of data is sought from a larger set of data based on a criterion or criteria, often called the search criteria, query parameter, or filter parameters. Note that for the purposes of the present discussion, a filtering operation may represent a type of data search. However, the term "filtering" often used when the criteria involves specification of one or more data dimensions to exclude or include in particular returned results. Furthermore, note that a collection of different searches and filtering operations and data manipulations initiated by a user so as to find particular information is also called a data search, or simply search herein.

Note the certain embodiments discussed herein may also (or instead) employ structural searches, whereby a smaller tree structure is used as a template to find similar tree structures among one or more larger tree structures.

Although specific data representations, database types, hardware or software components, programmatic techniques, or other details may be described, it should be apparent that variations in these designs and implementations are possible.

One example embodiment stores non-local structural information in (or in association with) each node of a tree. One representation of the information, i.e., metadata, may be a binary number or string encoded as a native NUMBER data type within the programming language or general digital computing system. Depending on the language or system representation, the representation may be a binary number, packed bits, integer, character string, etc. Although embodiments are described herein with respect to a particular number representation it should be apparent that other representations may be possible.

A further understanding of the nature and the advantages of particular embodiments disclosed herein may be realized by reference of the remaining portions of the specification and the attached drawings.

For clarity, certain well-known components, such as desktop computers, hard drives, processors, operating systems, power supplies, routers, Relational DataBase Management Systems (RDBMSs), middleware, Internet Service Providers (ISPs), and so on, are not necessarily explicitly called out in the figures. However, those skilled in the art with access to the present teachings will know which components to implement and how to implement them to meet the needs of a given implementation.

FIG. 1 illustrates a first example system 10 and accompanying computing environment employing specialized tree software 16, including a tree serialization module 20 and a tree comparing module 18, for selectively serializing trees and then using set operations to facilitate comparison operations on resulting serialized trees, the results of which are used to enhance the efficiency and functionality of software systems 12.

The example system 10 includes the software systems 12 in communication with a backend database 14. The backend database 14 may be hosted on a server system, e.g., a cloud-based platform, which may include one or more servers in one or more data centers.

The software systems 12 further communicate with the tree software 16. The tree software 16 also communicates with the backend database 14. The tree software 16 may also be implemented via one or more servers, e.g., as part of a broader cloud-based computing environment.

Note that in general, groupings of various modules 12-28 of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

For example, one or more of the software systems 12 may be incorporated on a server system that hosts the backend database 14. Alternatively, or in addition, one or more of the software systems 12 may be included on a client-side device. Similarly, the tree software 16 may be implemented server side and/or client side, depending upon the needs of a given implementation. The various modules 12-28 may be implemented on a single machine and/or distributed across a network, as part of a networked computing environment.

The example backend database 14 includes various stored data structures 24. The data structures 24 may include various hierarchical data structures, e.g., tree structures. Note that tree structures may also represent (or be represented by) hypercubes, nested computer code classes, functions, procedures, code fragments, other computing objects, etc.

In the present example embodiment, the tree software 16 includes code (e.g., as represented by modules 18-22) to facilitate serialization of hierarchical data structures, i.e., tree structures, among the stored data structures 24 of the backend database 14. The serialization of a tree structure involves use of an enumeration method, such as that disclosed in the above-identified and incorporated U.S. Patent, entitled USING PATH ENCODING METHOD AND RELATIONAL SET OPERATIONS FOR SEARCH AND COMPARISON OF HIERARCHICAL STRUCTURES.

The tree serialization is implemented via a tree serialization module 20 of the tree software 16. The tree serialization module 20 includes and implements instructions for accessing the stored data structures 24; then serializing hierarchal structures among the stored data structures 24, resulting in strategically serialized structures 26.

In the present example embodiment, the serialization includes selectively stripping information pertaining to the original order of sibling nodes of a given parent node of a tree, thereby resulting in conversion of the trees (to be compared via use of a metric function) into serialized trees represented as sets. This facilitates semantic searches, e.g., by enabling searches, e.g., for code optimization applications, to see through differences in sibling-node ordering, and find similarities of tree structures (e.g., code sections) that might otherwise be overlooked by other search methods, as discussed more fully below.

For the purposes of the present discussion, a metric function or distance function may be a function that provides a measure (e.g., metric) of a distance between each pair of elements of one or more sets. A metric space may be a pair M=(X, d) where X is a finite set of size N nodes, which is associated with a distance metric function, d: X×X→R+; for each a, b that is an element in X, the distance between a and b is given by the function d(a, b). All a, b, c are elements of the set X.

Note that, in embodiments discussed herein, it is not generally or necessarily true that two non-intersecting sets have a distance greater than zero and that two intersecting sets have a distance of zero, as this may depend upon the metric being used. For instance, if a normalized metric is used, the following assertions are true:

If two sets X and Y are equal (i.e. consist of the pairwise identical elements) then the normalized metric equals 0.

If the sets X and Y have non-empty intersection (i.e. some of elements of X may be equal to some of elements of Y) then normalized metric d lies within proper interval (0, 1), i.e. 0<d<1.

If the sets X and Y do not intersect (i.e. have no common elements at all) then normalized metric d=1.

Furthermore, in terms of normalized metric, two sets X and Y are considered similar if their metric is less than some small value between 0 and 1. The value can be derived differently for different practical applications. For instance, in certain specific embodiments of code analyzers, the distance threshold for determining whether or not two sets are similar may be set to 0.3.

The tree serialization module 20 accesses the stored data structures 24; then generates strategically serialized structures 26, e.g., serialized trees represented as sets, which may include information pertaining to tree path attributes, node attributes or descriptors, etc.

The tree serialization software 20 further communicates with a controller 22 of the tree software 16. The controller 22 may act as a form of middleware or interface that includes code for facilitating the routing of communications and functionality between the tree serialization module 20, the strategically serialized data structures 26, the software systems 12, and a tree comparison module 18.

The tree comparing module 18 includes code for selectively accessing the strategically serialized structures 26; then applying one or more metric functions to compare two or more trees using the one or metric functions. Output from the tree comparison module 18 may be stored as tree similarity data 28 for future use by one or more of the software systems 12.

Note that connections shown in FIG. 1 between the tree serialization module 20, the backend database 14, and the strategically serialized structures 26 are illustrative. For instance, such communications may instead be routed through the controller 22, without departing from the scope of the present teachings. Similarly, connections between the tree comparison module 18, the strategically serialized structures 26, and the tree similarity data 28 may also be routed through the controller 22 in certain implementations.

In operation, one or more of the software systems 12 may communicate with the backend database 14 and/or the tree software 16 to compare tree structures for a given application. The comparing may be implemented in accordance with one or more metric functions and/or tree-forest comparison methods (as discussed more fully below). For tree structures that have already been compared using one or more predetermined or pre-specified metric functions, the software systems 12 may access the backend database 14 to retrieve appropriate previously stored tree similarity data 28.

Alternatively, or in addition, the software systems 12 may issue request messages to the tree software 16, e.g., via one or more Application Programming Interfaces (APIs), web services, etc., requesting retrieval of particular tree similarity data 28, and/or to request that a given tree comparison operation be implemented, e.g., via the tree comparison module 18. Resulting tree similarity data retrieved by one or more of the software systems 12 may then be used to enhance functionality and efficiency of the one or more software systems 12.

Examples of the software systems 12 that may leverage the tree similarity data 28 and associated functionality of the tree software 16 include enterprise software, such as Customer Relationship Management (CRM) software and associated Business Intelligence (BI) software. Other examples of the software systems 12 include Artificial Intelligence (AI) engines and associated neural networks, natural language parsers, code parsers, interpreters (e.g., Just-In-Time (JIT) compilers), Integrated Development Environments (IDEs), code optimizers, and so on. Such applications may leverage data pertaining to (or otherwise indicative of) estimates or measurements of similarities or distances between trees, so as to facilitate enhanced efficiency; to provide additional functionality (e.g., search functionality), and so on, as discussed more fully below.

As a specific example, cloud-based software implemented in Structured Query Language (SQL) is often hierarchically structured. In some implementations hundreds of thousands of SQL programs may be employed by a given cloud to implement a set of functionality, e.g., as part of the software systems 12. Some such programs may suffer from performance issues. Such SQL programs may each have thousands of constituent hierarchically structured SQL clauses and/or sub-programs.

However, finding such SQL programs that are causing performance issues has, historically, been challenging, especially when using conventional text-based searches for similar segments or fragments of code. Various embodiments discussed herein are useful for rapidly and efficiently finding similarly structured SQL clauses, e.g., using comparison operations to compare trees and subtrees of different code sets.

When a problematic code section is found, the entire body of SQL programs can be searched for similar sections of code. The problematic code section can be optimized. Furthermore, the related or sufficiently similar code sections can be found; then further consolidated to leverage (e.g., call) the functionality of a single code fragment, program, or code section (which exhibits a hierarchical structure, e.g., tree structure).

As another example, an enterprise may use a bill of materials to describe certain product and/or service offerings. Such a bill of materials may exhibit redundant descriptions for a particular product. Software systems 12 that track bills of materials can then leverage the tree software 16 to find the redundant sections, and eliminate them; thereby reducing data storage, etc.

Figure 2:
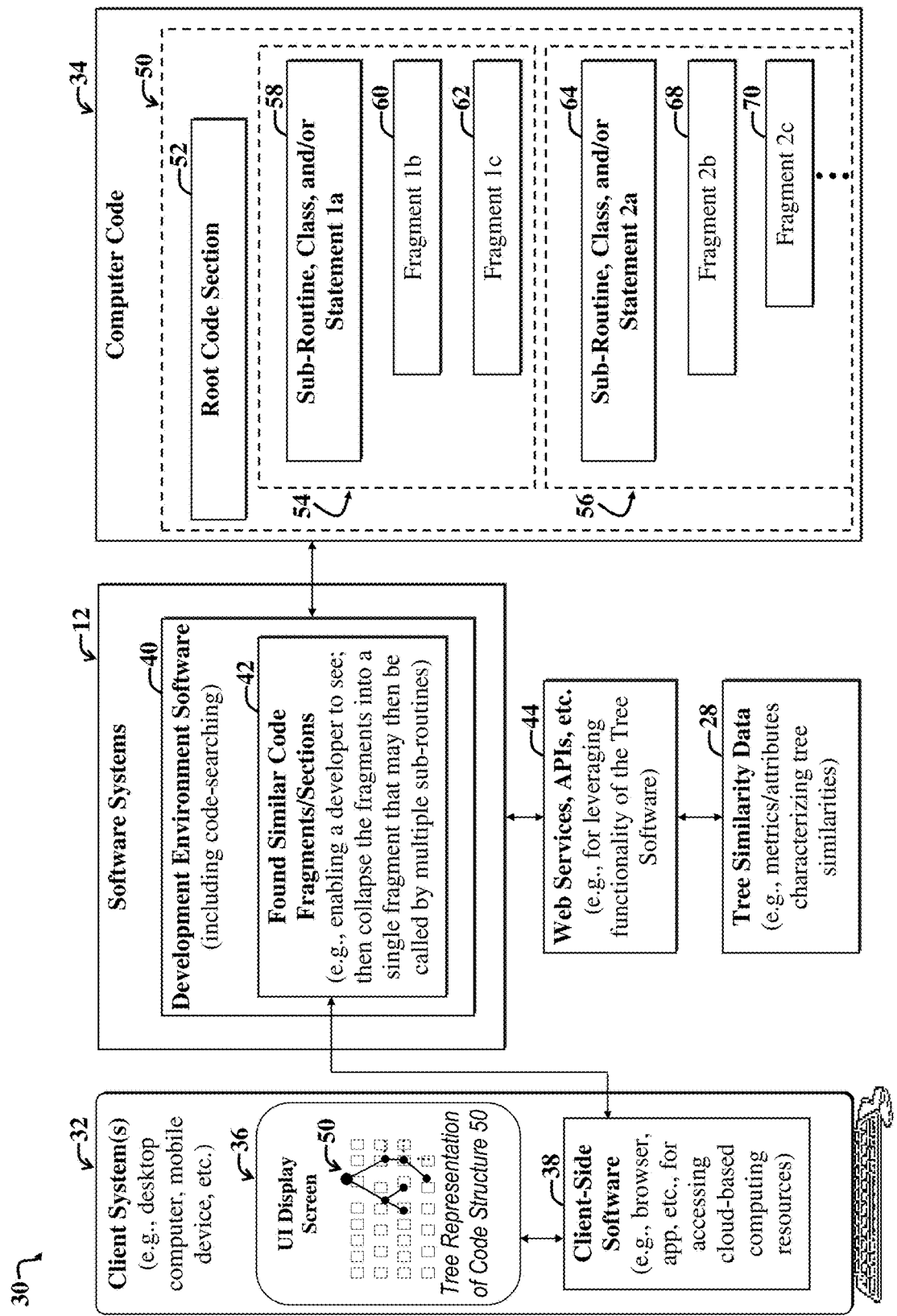
FIG. 2 illustrates a second example system, which is suitable for use with the first example system of FIG. 1, but further illustrates an example use of tree similarity data to facilitate computer code optimization, where computer code is often hierarchically structured and structurally representable via one or more trees.

FIG. 2 illustrates a second example system 30, which is suitable for use with the first example system of FIG. 1, but further illustrates an example use of the tree similarity data 28 to facilitate computer code optimization, where computer code 34 is often hierarchically structured and structurally representable via one or more trees.

The second example system 30 shows one or more client systems 32 in communication with the software systems 12. The client systems 32 may use client-side software 38, e.g., a browser, mobile device app, software development and code optimization user interface software, etc., to communicate with the software systems 12 via one or more web services or Application Programming Interface(s) (APIs).

In the present example embodiment, the software systems 12 include server-side software development environment software 40, with features for enabling searching, storage, and retrieval of the hierarchically structured computer code 34, responsive to communications with the client-side software 38. Retrieved computer code may be displayed in a User Interface (UI) display screen 36 of the one or more client systems 32.

Note that the computer code 34 of FIG. 2 may be stored via the backend database 14 of FIG. 1 among the stored data structures 24, along with the tree similarity data 28. For illustrative purposes, one or more web services or APIs 44 are shown interfacing the software systems 12 with the tree similarity data 28. Note that generally, web services and/or APIs may facilitate communications between various modules (e.g., the client system(s) 32, the software systems 12, the computer code 34, and tree similarity data 28) of the second example system 30.

The example computer code 34 includes hierarchically structured computer code 50, which represents a tree structure, which for illustrative purposes, is also graphically depicted in the UI display screen 36 of the client system(s) 32, and not just illustrated in block 34. The example computer code 34 represents an example tree 50 with subtrees 54, 56. In practice, the computer code 34 can include thousands of computer programs. The example tree 50 includes a root code section 52, corresponding to a top-level node, i.e., root code section 52, with various child sections, such as a first child section 54 and a second child section 56.

The first child section 54 includes a first sub-routine, class, and/or clause (1) 58, with child code fragments 60, 62 (first fragments 60, 62) which are sub-fragments or nested fragments. The first fragments 60, 62 (corresponding to fragments 1b and 1c, respectively) may be included in or called by the first sub-routine, class, and/or clause (1a) 58. The first fragments 60, 62 represent grandchild nodes of the root code section 52.

Similarly, the second child section 56 includes a second sub-routine, class, and/or clause (2a) 64, which includes or communicates with an accompanying child fragment (2b) 68. The child fragment (2b) 68 further includes its own child fragment (2c) 70, which is a grandchild of the second sub-routine, class, and/or clause (2a) 64.

The computer code 34 may represent SQL code or other type of code, e.g., C++, Java, etc. that can include hierarchically related modules or nested modules. For instance, the first code fragments 60, 62 may be called by the parent sub-routine, class and/or clause (1a) 58 to return results of computations, data retrievals, and so on, and/or other functionality (implemented via the first code fragments 60, 62) thereto for further handling.

The development environment software 40 may represent an Integrated Development Environment (IDE) which includes software for triggering searches of large sets of computer code to find similarities or differences between different tree structures in the computer code 34 using efficient tree-comparison operations.

Searching the computer code 34 (which in large enterprise applications may include thousands of computer programs) involves accessing the tree similarity data 28 and associated tree-similarity metrics for the different trees and/or subtrees being compared for a degree of match, i.e., based on a similarity score or metric, as discussed more fully below.

Initially, the tree software 16 of FIG. 1 may be called by the development environment software 40 to calculate and store the tree similarity data 28 for use by tree-based code-searching functionality of the development environment software 40 to find sections of code that exhibit sufficiently similar similarity tree-similarity metrics as the code section being used to match other code sections of the computer code 34 during a search operation.

If a problematic tree or subtree of a tree is identified, the entire computer code 34 can then be searched, e.g., by the tree comparison module 18 of FIG. 1 to find similarly structured sections or fragments of code. Inefficient similarly structured segments of code can often then be updated and/or the associated functionality can be consolidated into one efficient code section or fragment, which can then be called by other programs and/or sub programs or code fragments. This can improve overall code efficiency and can help to reduce the overall size of the code 50, as discussed more fully below.

For the purposes of the present discussion, a tree-similarity metric may be any value, score, estimate or other indicator that is indicative of how similar or different (e.g., how distant) two trees are based on one or more tree characteristics being compared. Embodiments discussed herein may employ different types of metric functions (as may be implemented via the tree comparison module 18 of FIG. 1) to process two or more trees for comparison operations, thereby yielding one or more tree-similarity metrics as output in response thereto.

In an example implementation, the computer code 34 may be a collection of thousands of SQL programs and accompanying code fragments distributed across a network, such as an enterprise computing environment. A software developer may use the client-side software 38 to display sections or pages of the computer code 34 via the UI display screen 36. Code sections can be analyzed and tested by the developer. When a slow or poorly performing code section is found, the developer may use the client-side software 38 to access server-side software development functionality provided by the development environment software 40 to facilitate finding similar code fragments/sections 42 among the computer code 34.

The meaning of the term "similar code fragments" may be adjusted, so as to meet the needs of a given implementation. For instance, a value of a specific type of similarity metric calculated by a predetermined metric function (that takes serialized tree structures representing the code as input) may represent or indicate similar tree structures, if the value is within a predetermined numerical range.

Note that trees need not be exactly similar to be considered similar, as trees may exhibit varying degrees of similarity. Furthermore, subtrees of larger trees being compared may be individually compared with each other. Some portions of larger trees being compared may be very similar, and yet the trees may be considered as similar or not similar, depending upon the needs of a given application.

Accordingly, the definition of "similar" may be adjusted in accordance with the needs of a given application or implementation. Different types of metric functions, tree-similarity score thresholds, and so on, can be used for different applications. Furthermore, different methods of using the same or different types of metric functions to implement broader tree comparison operations can be selected in accordance with the demands of a given application. For instance, tree-forest mechanisms discussed herein and more fully below may implement selectively weighted pairwise comparisons of subtrees of larger trees being compared.

Outputs of the metric functions (tree-similarity metrics) may be selectively scaled (e.g., via use of "importance weights") in accordance with priorities associated with the types of pairwise comparisons being performed. The results of the comparison operations of the subtrees may then be further selectively combined, e.g., using a linear combination of weighted tree-similarity metrics, as discussed more fully below.

Different metric functions that perform different comparison operations (e.g., different set operations), using serialized tree structures as input for computing a tree-similarity score can be used to meet the needs of different implementations.

Accordingly, the system 30 implements tree-comparison operations, resulting in tree similarity data 28 characterizing two or more structures. These comparison operations and associated tree similarity data 28 can then be used to search the computer code 34 for similar tree structures in the code 34. Pairs of code sections (corresponding to trees and/or subtrees) meeting a given similarity threshold for the resulting tree-similarity metrics obtained during the search operation, may collected among the found similar code fragments/sections 42, and then selectively displayed on the client systems 32 via the client-side software 38 and the UI display screen 36.

This can enables developers to identify other code sections of the computer code 34 that are similar to a particularly poorly performing code section. Note that, for the purposes of the present discussion, a code section may be any portion of computer code, which may include an entire program or subtrees thereof.

In an illustrative implementation, the development environment software 40 acts as an automated code optimizer, with instructions to detect an initial section of code that runs particularly slowly; then analyze the code to generate update suggestions for code optimizations. The automatically generated suggestions for ways to optimize a given code section can be provided for review to a developer using the client system(s) 32.

Alternatively, or in addition, the development environment software 40 may automatically implement its own adjustments to the code 50, e.g., by automatically adjusting a poorly performing code section; then searching the computer code 34 for similar code sections; then automatically updating the found similar code fragments/sections 42. Accordingly, similar code fragments can be searched for in the computing environment; found; then automatically adjusted and/or consolidated as needed to meet the needs of a given application or implementation.

Note that while the present embodiment of FIG. 2 is discussed with respect to a code optimization application, embodiments are not limited thereto. Efficient tree-comparison operations discussed herein may be applicable to virtually any type of search engine or other software application, database, data visualization application, spreadsheet, and so on, which utilizes tree structures to perform operations.

The present example embodiment leverages efficient structure-preserving tree labeling, in accordance with an enumeration method (as discussed more fully in the above-identified and incorporated US Patent) to serialize tree structures, then facilitates rapidly finding patterns in computer code that may otherwise be difficult to detect.

An embodiment second example system 30 of FIG. 2 has been successfully implemented using a code analyzer of the development environment software 40 to analyze SQL (Structured Query Language) code, analogous to the computer code 34 of FIG. 2. In one test, the implementation analyzed the SQL computer using methods discussed herein to find similar query blocks in an SQL SET operation. Over 95,000 similar UNION query blocks were detected in more than 28,000 custom distinct seeded SQL queries. Based on the analysis, dozens of SQL clauses were optimized, resulting in substantially improved performance.

Accordingly, the present example embodiment represents technology that facilitates finding similar pieces (e.g., programs, code sections, fragments, etc.) in a larger body of code; then displaying resulting information showing the differences, and/or showing results based on the differences.

This helps the developer to observe redundancies in code, and factor it out, e.g., by replacing many similar code sections with one or two sub-programs. This facilitates code reuse by the main program or higher-level programs or routines. Reducing the size of the overall program in this way may yield substantially increased performance of the program. Furthermore, poorly performing code sections can be rapidly detected, facilitating further code optimizations.

Note that the tree comparison operations discussed herein may detect not just similarities of wording of code (e.g., like text-comparison programs may be limited to) to illustrate mere text differences in lines of code, but embodiments enable detecting similarities of structural arrangements of the code. Such differences in structural arrangements, i.e., structural differences pertaining to the tree structures characterizing the code, are called semantic differences. Accordingly various embodiments discussed herein may find (e.g., estimate, compute, indicate, etc.) semantic similarities (structural organization similarities).

If the semantics of the code are similar (as defined for the purposes of a given implementation), embodiments discussed herein can detect those differences and display them via the UI Display screen 36 for the developer to view.

For instance, the meaning of an SQL FROM clause may appear the same, regardless of the ordering of the elements of the FROM clause. Embodiments may detect similarities in the clauses and display them, despite the differences in the ordering. Accordingly, sibling-node order information may be ignored in certain embodiments, which may facilitate code comparison operations.

The second example system 30 of FIG. 2 employs an efficient structure-preserving tree labeling method (enumeration method, e.g., as discussed more fully in the above-identified and incorporated U.S. Patent) to solve a practical task of finding patterns in computer programs.

Note that after trees are serialized, they may be stored as the strategically serialized structures 26 of FIG. 1, and re-used as needed. In certain embodiments, the strategically serialized structures are not re-constituted, as the comparison operations by the tree comparison module 18 of FIG. 1 work with serialized trees, represented by sets.

However, in certain implementations, the development environment software 40, will reconstitute the trees, e.g., for graphical display via the UI display screen 36 of the client system(s).

Figure 3:
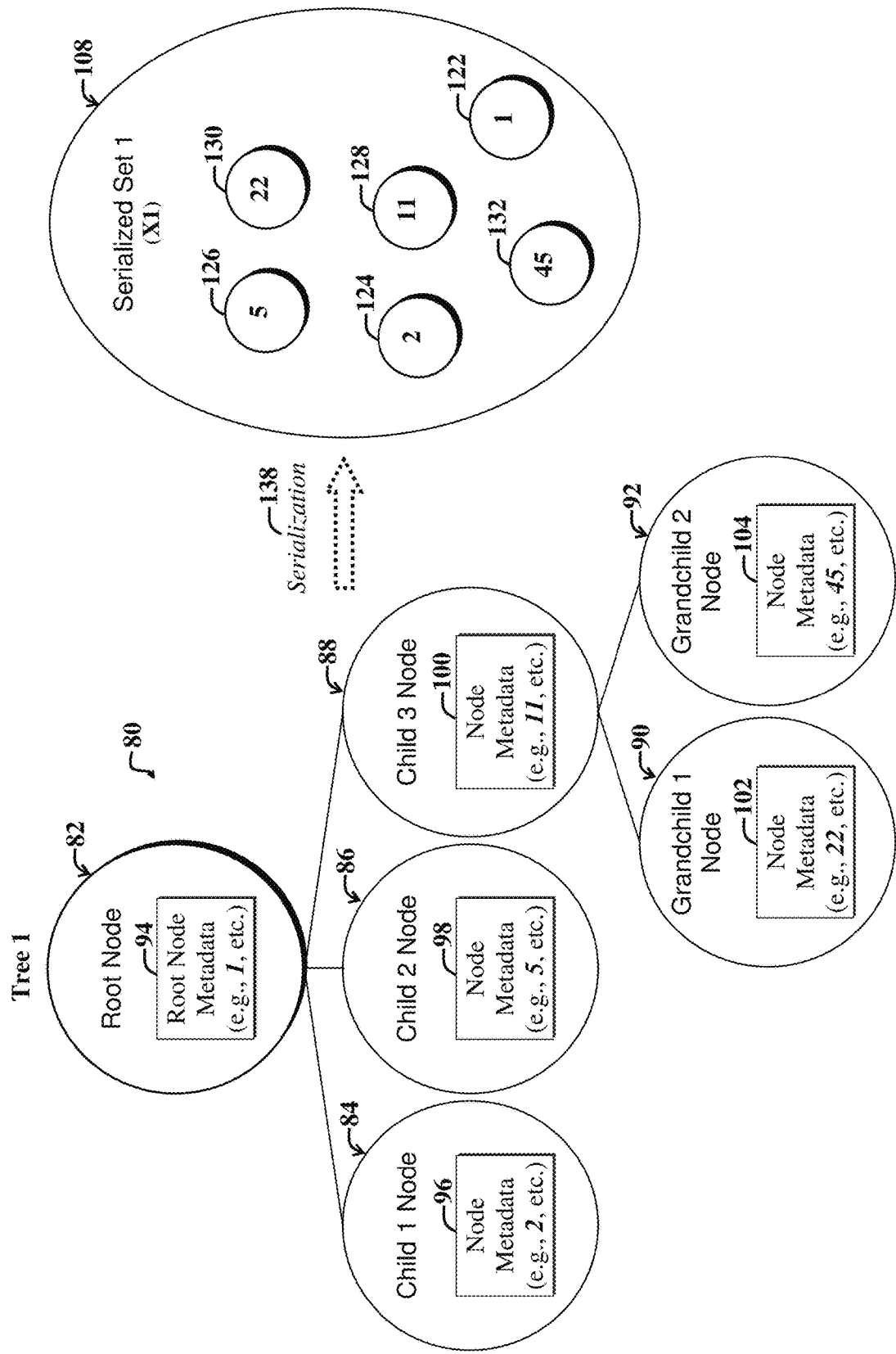
FIG. 3 illustrates a first example tree structure, which is serialized via an enumeration method, e.g., converted to a set representation upon which metric operations can be performed.

FIG. 3 illustrates a first example tree structure 80, which is serialized via an enumeration method, e.g., converted to a serialized set representation (e.g., a first serialized set (X1)

108) upon which metric operations can be performed, as discussed more fully below with reference to FIG. 7.

The first example tree 80 includes a root node 82, which has three child nodes 84-88 and two grandchild nodes 90, 92. Each of the nodes 82-92 includes or is otherwise associated with or characterized by metadata. For instance, the root node 82 is characterized by root node metadata 94. The root node metadata 94 may include path and structure information describing the tree structure above the root node 82, e.g., indicating that the root node 82 has no parents or ancestors. The metadata 94 may also include information describing or characterizing contents or properties of the root node 82.

Similarly, the other sub-nodes 84-92 include or are associated with respective node metadata 96-104, which may incorporate path labeling data, e.g., tree structure data, as well as other metadata describing contents of each of the nodes 84-92. Note that metadata describing contents of each of the nodes 84-92 may also be serialized and adapted for use with efficient set operations, as discussed more fully below.

The first child node 84 includes first child node metadata 96. For instance, in the present example embodiment, the integer "2" (indicated among the first child node metadata 96) represents structural metadata (path-labeling metadata) describing the part of structure of the first tree 80 between the first child node 84 and the parent root node 82.

Note that decimal integer "2" is "10" in a binary representation. The first digit of binary representation "10" is "1" and represents the binary representation of the decimal integer representation of the path-labeling metadata of the root node metadata 94. The second digit of "10" is "0" and indicates that the first child node 84 is a child of the root node 82. The second digit, i.e., "0" may be called a "path label" for the tree path between the first child node 84 and the root node 82.

Similarly, the second child node 86 of the root node 92 includes second child node metadata 98. The integer "5" among the second child node metadata 98 is "101" in binary. The "101" represents the binary representation of the example first child node metadata "10" appended with a "1." The appended "1" indicates that the second child node 86 is a sibling of the first child node 84. The appended "1" may represent a path label between the first child node 84 and the second child node 86.

The metadata "101" of the second child node 86 describes the structure of the portion of the first example tree 80 that includes the root node 82, the first child node 84, and the second child node 86. Given that the second child node 86 is a sibling of the first child node 84, then it must also a child of the root node 82.

Similarly, the third child node 88 of the root node 82 includes third child node metadata 100. The integer "11" among the third child node metadata 100 is "1011" in binary, which corresponds to the "101" binary representation of the example decimal integer "5" of the second child node metadata 98, but with an additional "1" appended thereto. The additional "1" indicates that the third child node 88 is a sibling of the second child node 86. The appended "1" may represent a path label between the second child node 86 and the third child node 88.

The metadata "1011" of the third child node 88 describes the structure of the portion of the first example tree 80 that includes nodes 82-88, i.e., the root node 82, the first child node 84, the second child node 86, and the third child node 88. Note, that since the child nodes 84-88 are siblings, in accordance with the third child node metadata 100, i.e., in accordance with "1011," it is given that they are all also children of the root node 82.

Similarly, the first grandchild node 90 includes first grandchild node metadata 102. The integer "22" among the first grandchild node metadata 102 is "10110" in binary. This represents the binary "1011" of the third child node metadata 100, with an additional appended "1." The appended "1" indicates that the first grandchild node 90 is a child of the third child node. The example metadata "10110" for the first grandchild node 90 therefore describes the structure of the portion of the first example tree 80 that includes nodes 80-90.

Similarly, the second grandchild node 92 includes second grandchild node metadata 104. The integer "45" among the first grandchild node metadata 102 is "101101" in binary. This represents the binary "10110" metadata of the first grandchild node 90 appended with an additional "1." The appended "1" indicates that the second grandchild node 92 is sibling of the first grandchild node 90, and also, implicitly, a child of the third child node 88. The example metadata "101101" for the second grandchild node 92 therefore describes the structure of the entire first example tree 80.

Accordingly, in a binary representation of the node metadata 94-104, the "1s" represent path labeling between sibling nodes, and the "0s" represent path labeling between a parent and an oldest child, as a tree is traversed, e.g., from top to bottom, and left to right, as path labeling is applied during an example serialization of the first example tree structure 80.

This structure of the first example tree 80 is described by the second grandchild node metadata 104 (e.g., 11011011). Note that while binary representations are used for ascertaining tree structures in embodiments discussed herein, note that other number systems may be used (e.g., the decimal system) that are suitable for mathematical set operations, as discussed more fully below. If a particular number system is not directly suitable to a particular application, then the number system may be converted to or mapped to a suitable number system, e.g., a binary number system.

The tree structure 80 is said to be serialized via use of metadata describing the first example tree structure 80, where the serialization may be implemented using the structural encoding method (also called an enumeration method) discussed herein.

Accordingly serialization of the tree 80 may use any suitable method that results in a description of the tree 80 using one or more numbers. Serialization of the first example tree structure 80 results in an example first serialized set (X1) 108. Nodes 122-132 of the first serialized set 108 represent serialized versions of respective nodes 82-92 of the first example tree 80. The serialized nodes 122-132 of the first serialized set (X1) have incorporated tree structure information, e.g., path information. Accordingly, lines indicating paths between nodes have been removed from the illustrated first serialized set (X1) 108, as the path and tree structure information are incorporated into metadata of the respective nodes 122-132. The resulting serialized set (X1) 108 can then be used with mathematical set operations to facilitate efficient tree comparison operations, as discussed more fully below.

Note that, in practice, trees can be serialized into an optimized set of indexed relational tables, text files, binary files, or other types of files. Using various embodiments discussed herein, the overall process of reading the trees from the storage and computing a distance (or tree-similarity metric) between them is extremely fast and lightweight relative to previously known techniques for comparing tree structures.

The labeled tree can be further treated as (i.e., converted into) a set (e.g., the set of labeled nodes 122-132 of the first serialized set (X1) 108, without loss of information about the structure of the tree (e.g., the first example tree 80). For two distinct trees, one may employ embodiments discussed herein to quickly compute or estimate a distance (or tree-similarity metric) between them by using one or more metric functions defined on the constituent sets.

One embodiment, as discussed more fully below (e.g., with respect to FIG. 7) defines a metric function on a set of mathematical tree structures, i.e., serialized tree structures described by sets suitable for mathematical set operations, such as metric functions for computing tree distances or tree-similarity metrics.

Figure 6:
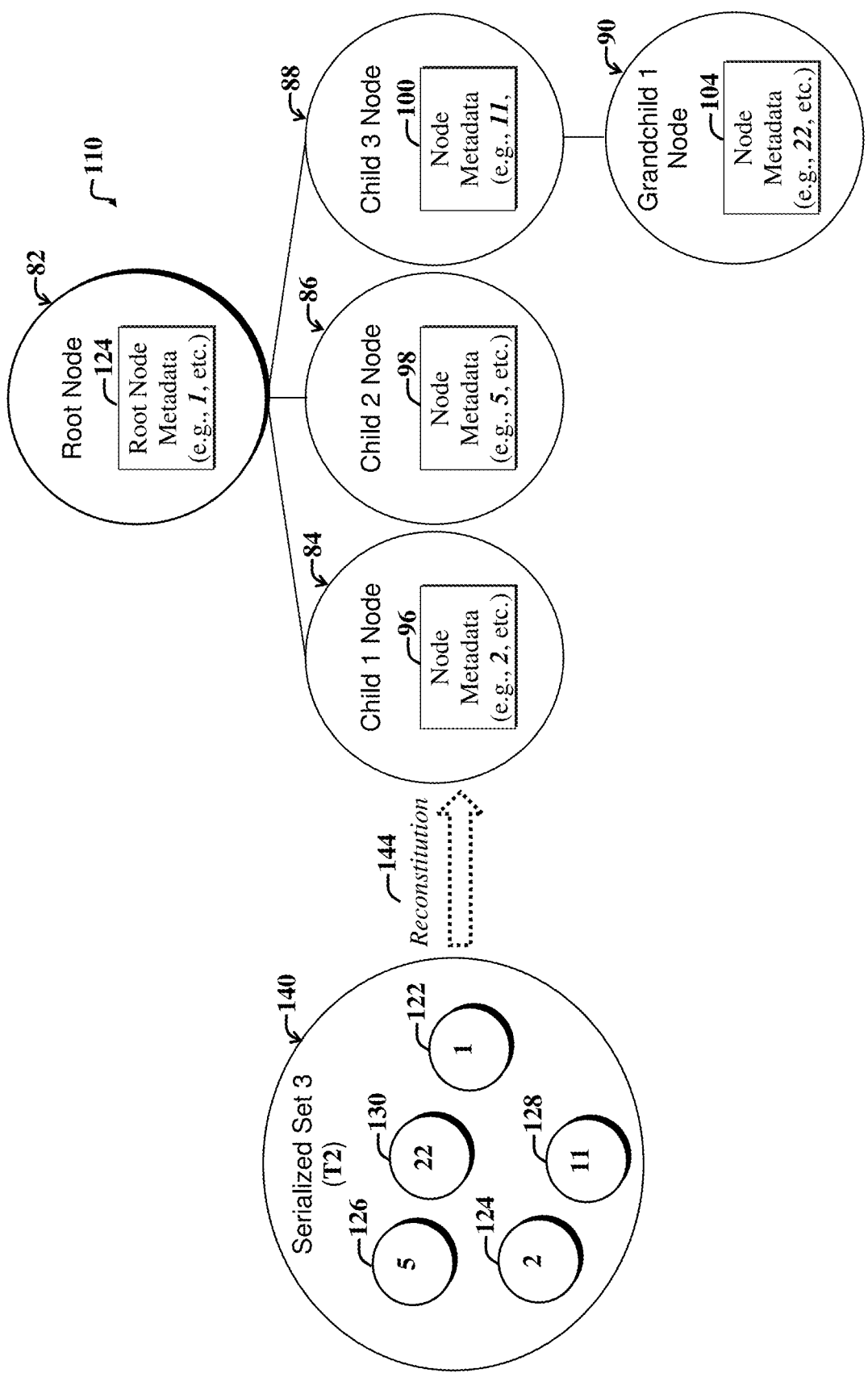
FIG. 6 illustrates reconstruction of serialized data output from the set operation of FIG. 5 into a corresponding third tree structure.

The enumeration method discussed with reference to FIG. 6 represents an efficient structure-preserving tree labeling method. Various embodiments may then apply the labeling to solve a task of finding patterns in code of computer programs (or in other hierarchical structures) that may otherwise be difficult to detect. Accordingly, various embodiments discussed herein may provide a platform upon which an arbitrary application could be developed.

Figure 4:
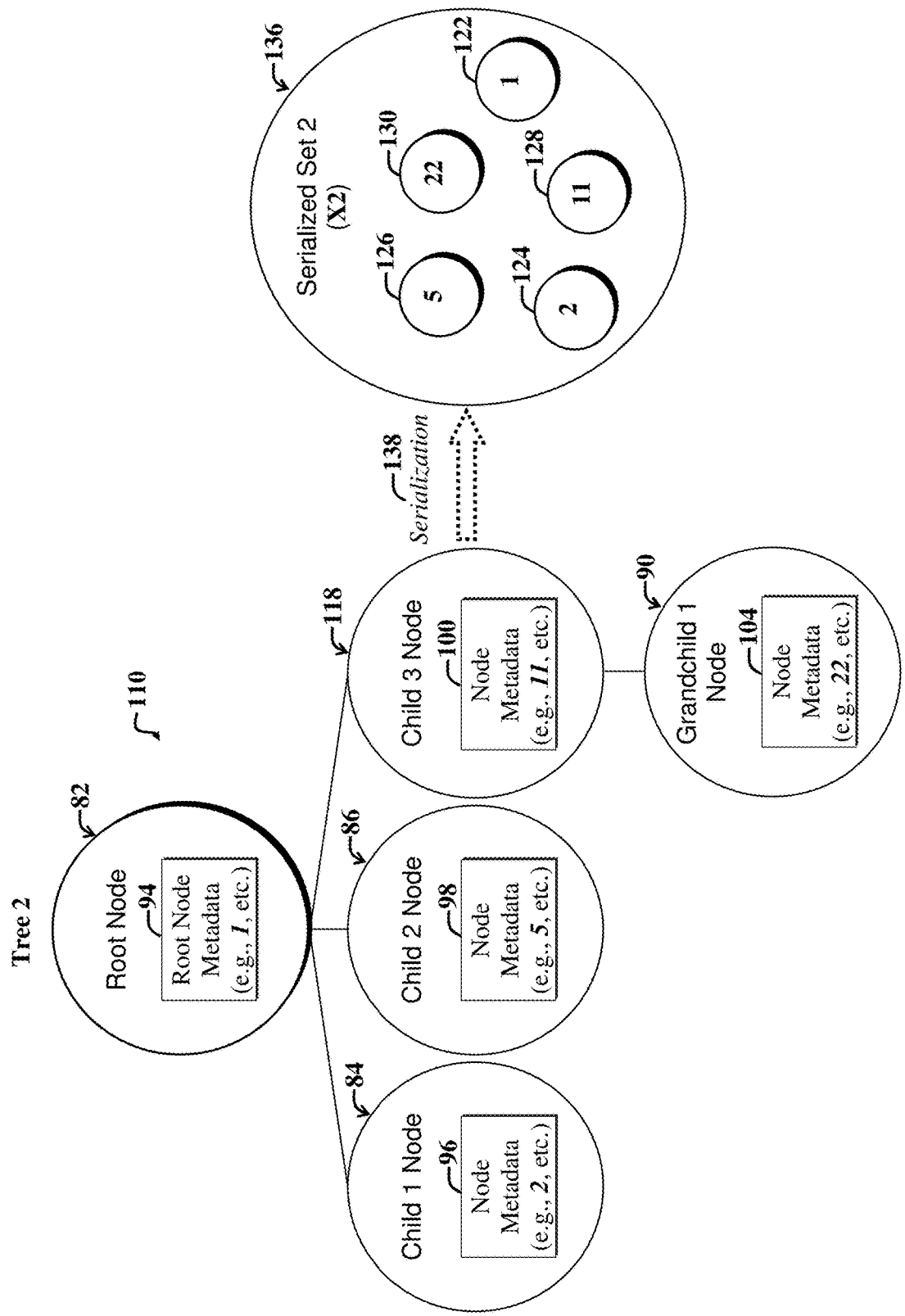
FIG. 4 illustrates serialization of a second example tree structure, which is a subset of the first example tree structure of FIG. 3.

FIG. 4 illustrates serialization of a second example tree structure 110, which is a subset of the first example tree structure 80 of FIG. 3. Note that the structure of the entire tree 110 can be described by the first grandchild node metadata 104.

For instance, the decimal integer "22" can contain structural information for the entire second example tree structure 110. For instance, when represented in binary, the integer "22" is "10110." This indicates that the first grandchild node 122 is a child of a node that has two other siblings that are, in turn, children of a root node, e.g., the root node 112.

Serialization 138 of the second example tree structure 110 results, for instance, in a second serialized set (X2) 136, which is similar to the first serialized set (X1) 108 of FIG. 3, but which lacks the serialized second grandchild node 132 thereof.

Figure 5:
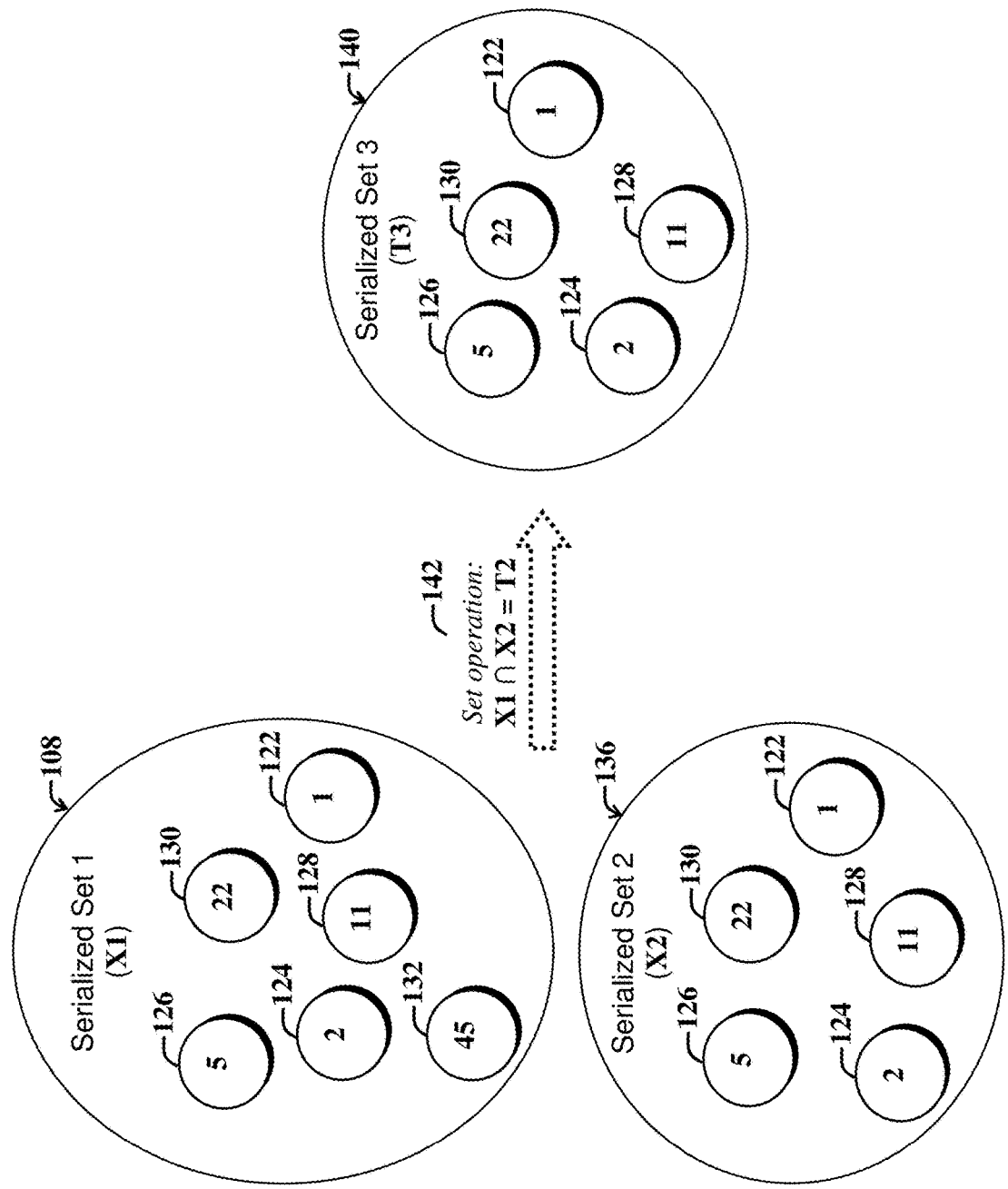
FIG. 5 illustrates an example of a set operation performed on serialized tree structures of FIGS. 3 and 4 using resulting serialized data represented as sets.

FIG. 5 illustrates an example of a set operation (and in this case, an intersection operation) performed on serialized tree structures 108 and 136 of FIGS. 3 and 4, respectively, using resulting serialized data represented as sets.

As shown in FIG. 5, an intersection operation 142 takes the first serialized set (X1) 108 and the second serialized set (X2) 136 as inputs to the intersection operation 142, which results in a third serialized set (T3) 140 as output in response thereto.

Note that the resulting intersection of the two input sets (X1∩X2) results in in the output set (T3) 140, which is substantially equivalent to the second serialized set (X2) 136, which is input into the set operation 142.

Note that the set operation 142 of FIG. 5 represents a simple example of using a set operation to compute a type of difference between the first serialized set (X1) 108 and the second serialized set (X2) 136, as represented by the third serialized set (T3) 140, to the extent that the intersection operation 142 measures overlap between the two input sets (X1, and X2) 108, 136, as represented by the third serialized set (X3) 140.

However, in various embodiments discussed more fully below, more advanced set operations are used to output one or more tree-similarity metrics using metric functions. Various types of metric functions may be employed to meet the needs of a given application, as discussed more fully below.

In summary, FIG. 5 illustrates a simple intersection operation 142. The intersection of the two serialized input sets 108, 136 (which represent serialized tree structures) yields the third serialized set (T3) 140 at the output of the intersection operation 142. The third serialized set (T3) is one indicator of how different the sets are, i.e., the output set 140 may represent a tree-similarity indicator or metric.

Accordingly, embodiments discussed herein are not limited to using metric functions to operate on sets to facilitate understanding differences and similarities between the sets.

Furthermore, note that various embodiments discussed herein can be applied to both ordered and unordered trees. Furthermore, use of generic mathematical objects (e.g., sets of serialized input trees) as inputs to metric functions enables generic broad applications for embodiments discussed herein that use mathematical metric functions to generate tree-similarity metrics, scores, or distance metrics.

A generic broad method disclosed herein, of converting trees into mathematical sets, i.e., serializing them, and then strategically using set operations such as metric functions applied to those mathematical sets, can represent an operational framework for tree-comparison operations. Such a framework may accommodate arbitrary data types (e.g., different types of outputs from different tree enumeration methods) and algorithms (e.g., metric functions, tree-forest comparison methods, and so on) in accordance with the needs of a given application or problem solution.

In summary, an arbitrary tree can be labeled by applying enumeration method (as discussed in the above-identified and incorporated U.S. Patent), and also as discussed herein with reference to FIG. 3. The labeled tree can further be treated as a set (of labeled nodes) without loss of information about structure of the tree.

For two distinct trees, one can compute distance (e.g., tree-similarity metric) between them by using one or more metric functions defined on the sets. Distances may represent tree-similarity metrics, as discussed more fully below. The terms "metric function" and "distance function" may be employed interchangeably herein.

FIG. 6 illustrates reconstruction of serialized data output from the set operation of FIG. 5, i.e., the third serialized set (T3) 140 into the corresponding third tree structure 110 via a reconstitution function 144.

Note that generally, embodiments discussed herein need not require reconstruction of a serialized set into the original tree structure, as various embodiments may work with non-structured sets of nodes.

Note however, that in certain system-level embodiments, serialized sets may be reconstituted, such as for the purposes of displaying results of tree operations via the UI display screen 36 of FIG. 2 to a developer; displaying data visualizations resulting from tree-comparison operations discussed herein, and so on. Those skilled in the art with access to the present teachings may readily implement the reconstitution function 144 by reversing the serialization process, without undue experimentation.

Note that trees can be serialized into an optimized set of well-indexed relational tables or into text or binary files in accordance with various embodiments discussed herein. An overall process, in accordance with the present teachings, of reading the trees from the storage and computing a distance between them, can be extremely fast and lightweight.

Figure 7:
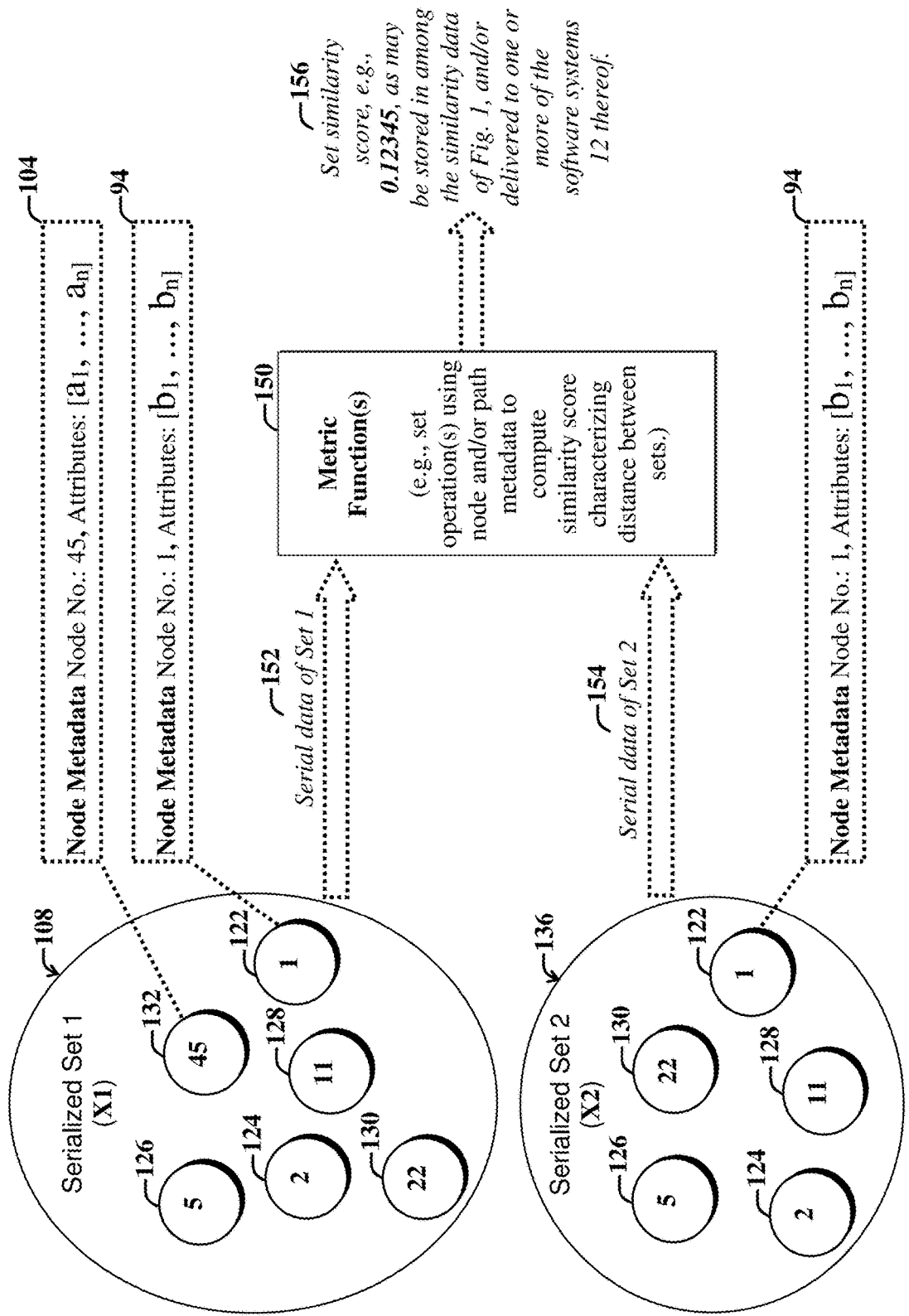
FIG. 7 illustrates use of a metric function, which takes serialized tree structures of FIGS. 3 and 4 as input to a metric function, which calculates a similarity metric or distance metric comparing the serialized tree structures of FIGS. 3 and 4.

FIG. 7 illustrates use of a metric function 150, which takes the serialized tree structures 108, 136 of FIGS. 3 and 4 as input to the metric function 150, which then calculates a tree-similarity metric or distance metric comparing the serialized tree structures 108, 136 of FIGS. 3 and 4.

Note that the nodes 122-132 of the first serialized set (X1) 108 represent serialized versions of the corresponding pre-serialized nodes 82-92 of FIG. 3, where the tree structure 80 of FIG. 3 has been incorporated into node metadata, e.g., into the second grandchild node metadata 104 of FIG. 3 (which includes, but is not necessarily limited to, the accompanying node metadata "45"), the root node metadata 94 of FIG. 3 (which includes, but is not necessarily limited to, the node metadata "1"), and so on. Example attributes, $[a_1, \ldots, a_n]$ of the second grandchild node metadata 104 of FIG. 3 (corresponding to "45" in FIG. 7) may represent or include the binary representation of the decimal integer label "45," i.e., [1,0,1,1,0,1 . . . ], of the second grandchild node metadata 104 of FIG. 3.

Similarly, attributes, $[b_1, \ldots, b_n]$ of the root node metadata 94 may represent or include the binary representation of the decimal integer label "1," i.e., [1 . . . ], of the root node metadata 94, and so on. Note that the node metadata 94, 104 of FIG. 3 may include additional serialized data, e.g., data describing one or more properties, aspects or attributes of the associated nodes.

In the present example embodiment, a first set of serial data 152 representing the first serialized set (X1) 108, and a second set of serial data 154 representing the second serialized set (X2) 136, are input to the one or more metric functions 150. The exact type of metric function or functions used to implement the metric function(s) 150 are implementation specific, and may vary depending upon the needs of a given implementation, without departing from the scope of the present teachings.

By way of example, the metric function(s) 150 output(s) a tree-similarity score 156, also called a set-similarity score, a distance metric, or a tree-similarity metric herein. Note that a tree-similarity metric may also represent a difference metric, since a lower tree-similarity metric value may be equivalent to a higher difference metric value.

Some example metric functions that may be employed to implement various embodiments discussed herein are discussed more fully below.

Let $X_i$ and $X_j$ be two sets and $$x_i=|X_i|, x_j=|X_j|, x_{ij}=|X_j \cap X_j|, m_{ij}=x_i-x_{ij} \quad [0]$$

The following is an incomplete list of set metrics that can be used to compute distances between two trees represented as sets:

1. The set difference metric:

$$d_{sd}(X_i,X_j)=|X_i \cup X_j|-|X_i \cap X_j|=x_i+x_j-2x_{ij}=m_{ij}+m_{ji} \quad [1]$$

2. The Jaccard metric—that is the set difference metric normalized by the size of the set union:

$$\overline{d_{sd}}(X_i,X_j)=(m_{ij}+m_{ji})/(x_i+x_j-x_{ij})=1-x_{ij}/(x_i+x_j-x_{ij}) \quad [2]$$

3. The maximum difference set metric:

$$d_{max}(x_i,X_j)=\{|X_i|,|X_j|\}-|X_i \cap X_j|=\max\{m_{ij},m_{ji}\} \quad [2]$$

4. The normalized metric:

$$\overline{d_{max}}=\max\{m_{ij},m_{ji}\}/\max\{x_i,x_j\}=1-x_{ij}/\max\{x_i,x_j\}$$

5. A set-based analogue of the Minkowski metric:

$$d_{2,p}(X_i, X_i) = \left(m_{i,j}^p + m_{j,i}^p\right)^{\frac{1}{p}} \quad [5]$$

As shown above, set metrics may be computed using standard set operations: union, intersection, difference, etc. Each set operation implies that an identity is defined for each element of a set.

Figure 12:
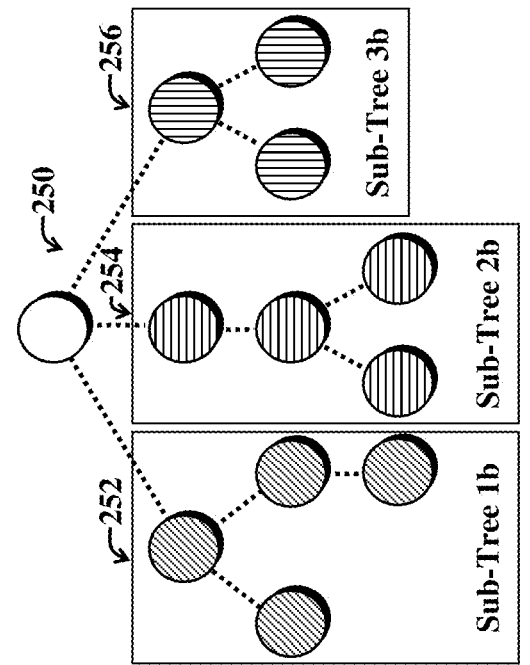
FIG. 12 illustrates two example trees, which have subtrees that have been partitioned in preparation for pairwise comparison operations in accordance with various embodiments discussed herein.
Figure 12:
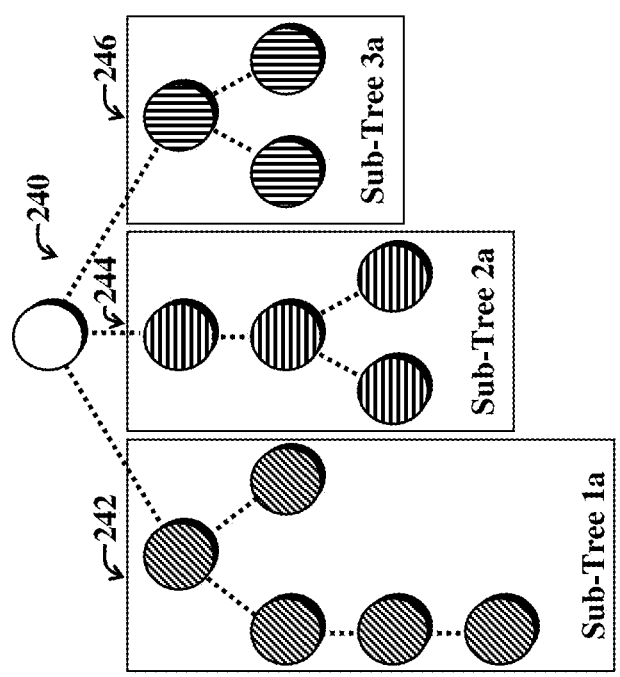
Figure 13:
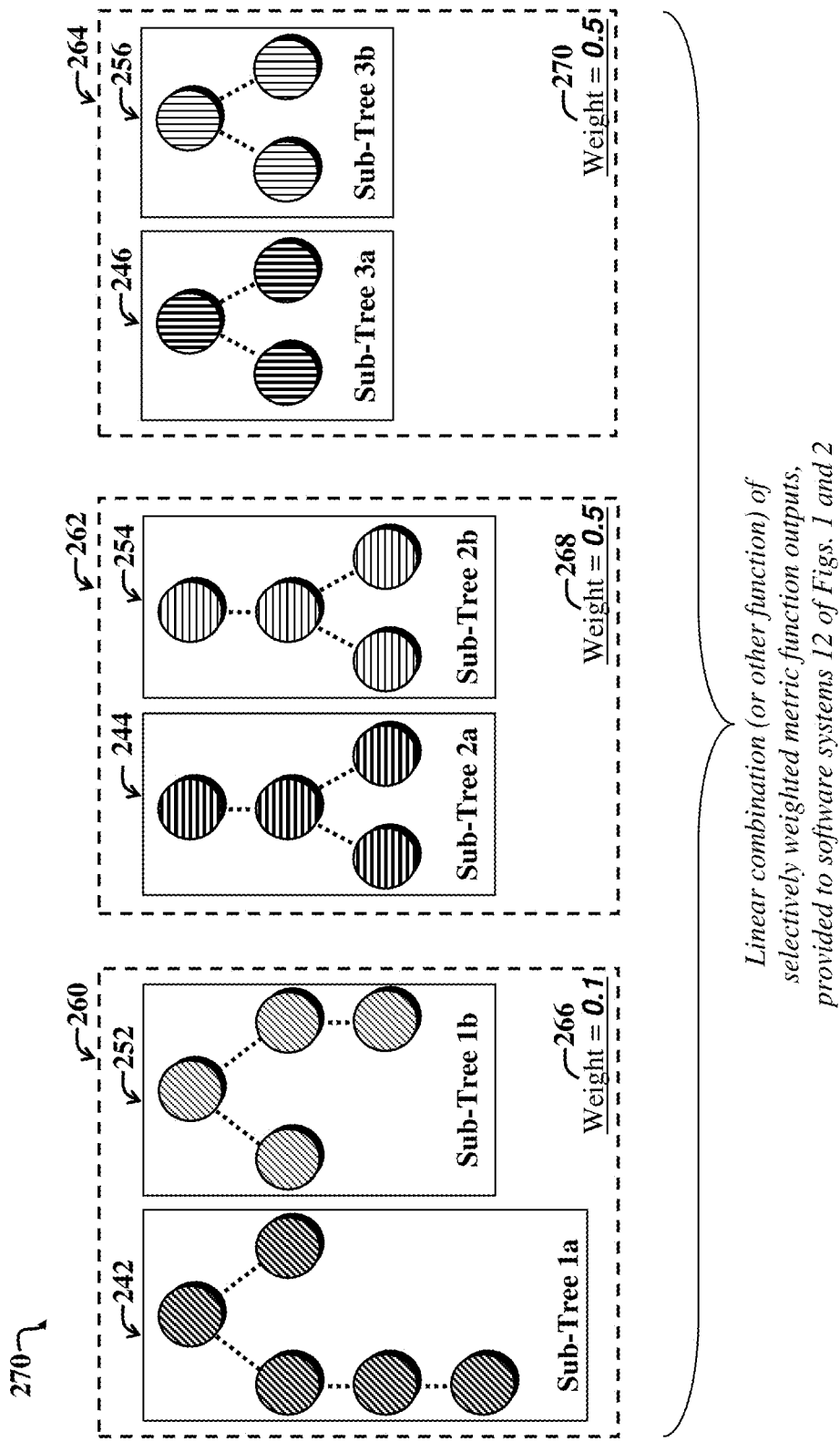
FIG. 13 illustrates an example of a pairwise comparison using the subtrees of FIG. 12, in addition to use of selectively applied weights, or importance scores, to particular comparison operations.

Note that various embodiments discussed herein provide flexible and powerful mechanisms facilitating, for instance these features:

1) Computation of distance metrics between sets using different collections of attributes of tree nodes, where depending upon the problem being solved.
2) The distance can be computed using only labels of the nodes (i.e., purely structural distance) or labels plus some subset of attributes carried by nodes.
3) Embodiments can accommodate both ordered and unordered trees.
4) Operations can be performed directly on serialized trees, e.g., which may be stored in a database or data store (e.g., eXtenisble Markup Language (XML), JavaScript Object Notation (JSON), etc.).
5) Embodiments can be used to compare pairwise distances between forests of weighted trees, as discussed more fully below with reference to FIGS. 12, 13.

Figure 8:
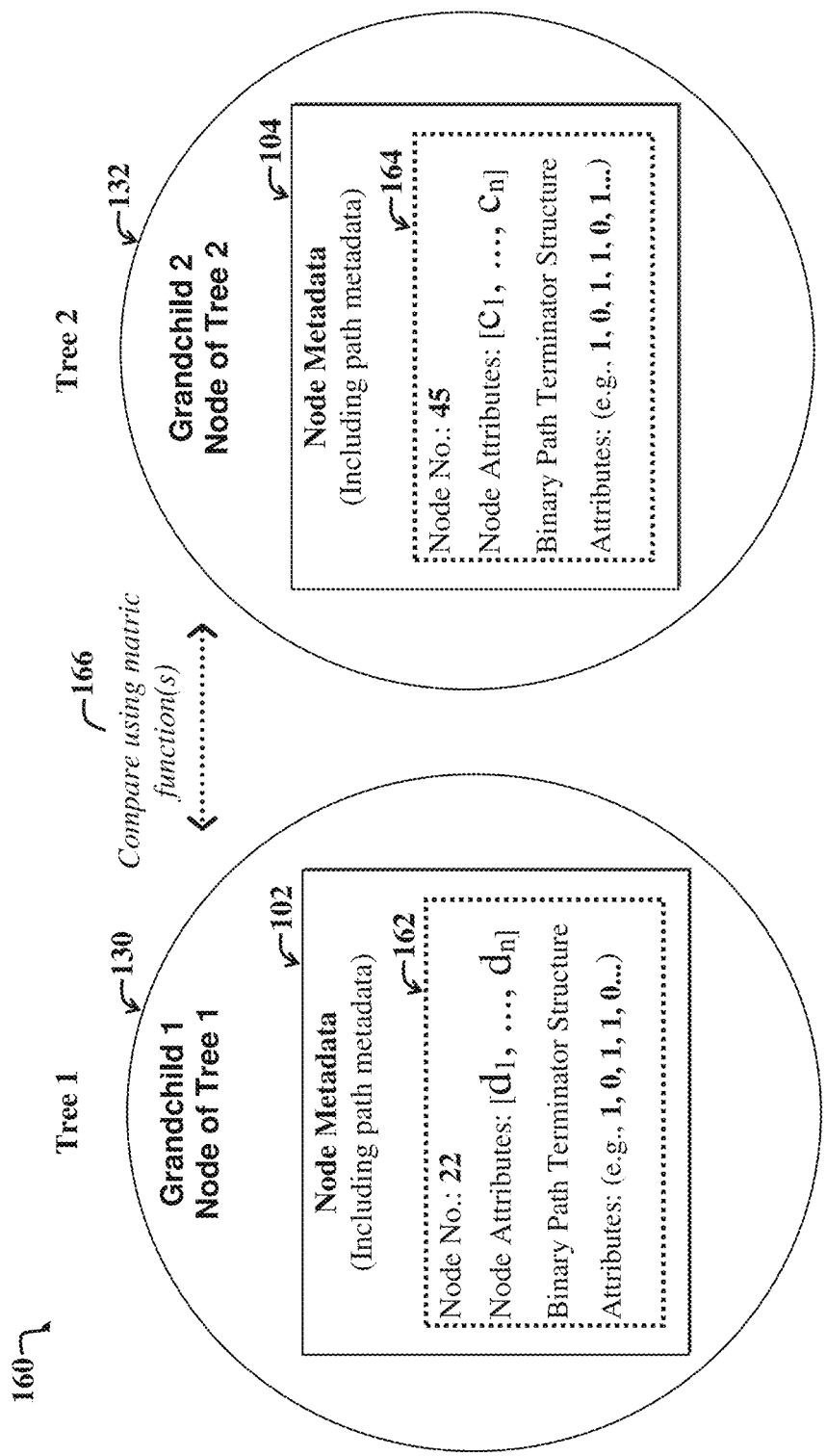
FIG. 8 illustrates use of one or more metric functions to compare, pairwise, individual nodes of the tree structures of FIGS. 3 and 4.

FIG. 8 illustrates use of one or more comparison metric functions 166 to compare, pairwise, individual nodes of the tree structures of FIGS. 3 and 4.

In an example comparison operation 160 illustrated in FIG. 8, the serialized version 130 of the first grandchild node 90 of FIGS. 3-4 is compared with the serialized version 132 of the second grandchild node 92 of FIG. 3 using one or more comparison functions 166.

Accordingly, a given node of a first serialized set may be compared with each node of a second serialized set, so as to detect a match or degree of similarity between the first node and other nodes of the second set. This type of operation can be used to search the second tree for nodes that match the first node, or otherwise meet a predetermined tree-similarity metric value threshold. Similarly, subtrees of a first tree may be compared with one or more subtrees of a second tree, e.g., as when comparing forests of trees, as discussed more fully below with reference to FIGS. 12, 13.

Accordingly, embodiments are not limited to comparing entire independent trees. Any combination of serialized nodes from one serialized tree may be compared with any combination of serialized nodes from another serialized tree, without departing from the scope of the present teachings. Furthermore, different tree sections may also be compared in a similar manner.

Note that any subset of {$attribute_1$, $attribute_2$, $attribute_3$, . . . , $attribute_n$} can be employed to define an arbitrarily complex logic of an applicable identity operation. Accordingly, a distance metric indicating a distance between two serialized trees can be computed using node-specific identity operation that uses one or more of the following: Node labels only, where embodiments may determine the distance between two trees using their shapes while ignoring any application-specific information; and/or node labels plus a subset of node attributes. Accordingly, embodiments can determine the distance between two trees based on their shapes and/or as their contents, depending upon the needs of a given implementation.

Figure 9:
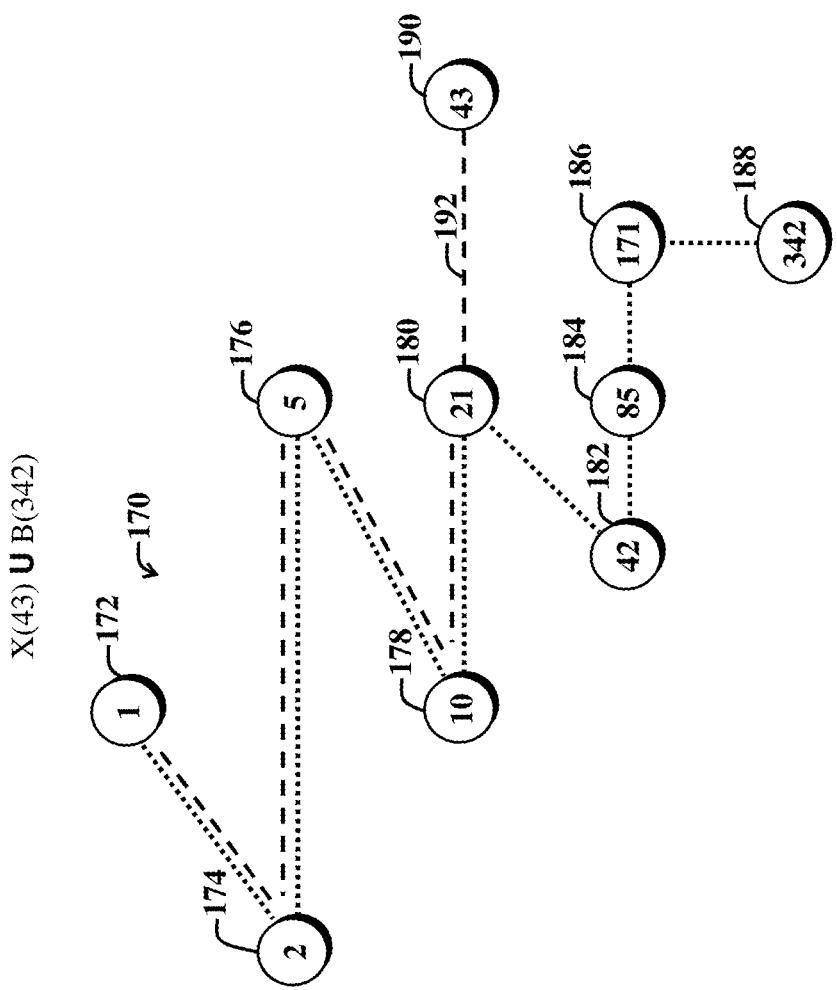
FIG. 9 illustrates a union of two trees, which further illustrates mathematical principles behind various embodiments discussed herein.

FIG. 9 illustrates a union of two example trees, which further illustrates mathematical principles behind various embodiments discussed herein. The tree union is shown as a larger tree 170, which includes a first tree identified by nodes 172-188, and a second tree identified by nodes 172-180, 190.

Note that each of the nodes includes a decimal integer label, which when converted to binary, represents a binary path labeling that describes the structure of the associated tree. For instance, node 188 is labeled "342," which, in binary, may represent the set {1,0,1,0,1,0,1,1,0} that describes the first tree.

The second tree represented by nodes 172-180, 190, can be structurally defined by the node 190, which has a decimal integer label of "43." In binary, the label "43" may represent the set {1,0,1,0,1,1}. The last digit, "1" of the set indicates that the node 190 is a sibling of the node 180, which is labeled as "21," which corresponds to the set {1,0,1,0,1} in binary.

Figure 10:
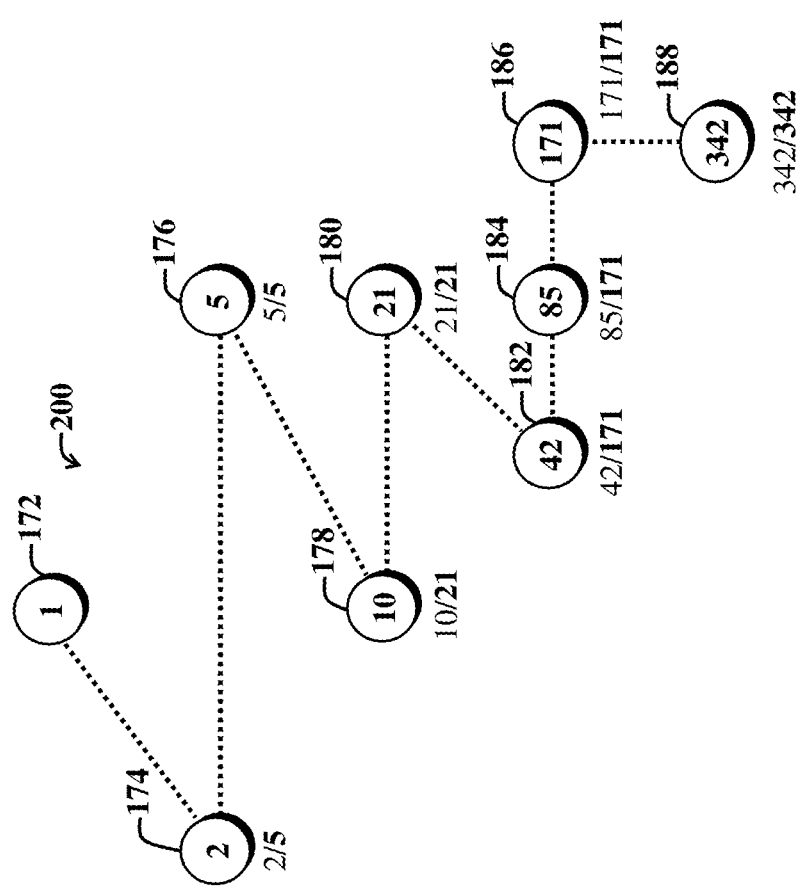
FIG. 10 illustrates one of the trees of the union of trees shown in FIG. 9, but further illustrates additional labeling after serialization, where the labeling represents removal of ordering of child nodes, so as to facilitate set operations and associated functionality to filter out irrelevant semantics and sibling-node ordering information from certain comparison operations.

FIG. 10 illustrates one of the trees (identified by nodes 172-188) of the union of trees (i.e., the larger tree 170) shown in FIG. 9, but further illustrates additional labeling after serialization.

The additional labeling represents removal of ordering of child nodes, so as to facilitate set operations and associated functionality to filter out irrelevant semantics and sibling-node ordering information from certain comparison operations. However, additional attributes can be added to a given node to provide more information as to structural properties of a given set of sibling nodes at any one (or all) of the sibling nodes.

For instance, the node labeling "2/5" of node 174 (with a label of "2") has been augmented with a "/5," such that the augmented metadata of "2/5" at node 174 indicates that the node 174 has a sibling labeled "5," which was the last serialized sibling of node 174 in the row of sibling nodes of the original non-serialized tree. Similarly, node 176, with an original label of "5" has been augmented with a "/5," indicating that it was the last serialized node of the set of sibling nodes that the node 176 is part of.

As another example, nodes 182-186 are sibling nodes. Metadata for the sibling nodes 182-186 have been augmented with a "/171," corresponding to the label of the last serialized node 186 of that set of sibling nodes 182-186.

Note that this type of labeling preserves parent-child relationships between nodes, while removing "order of siblings" information, i.e., the trees are converted into serialized trees represented as sets, also called or "tree sets" or "set representations." This facilitates so-called "semantic searches," whereby embodiments can find similarities between trees, despite differences in ordering of child nodes.

This can be particularly useful when searching hierarchical computer code, where the particular order of sibling nodes can be substantially irrelevant to the function of the ancestor nodes. This enables embodiments to "see through" differences in semantics to identify similar pieces of code that may otherwise be difficult or impossible to detect standard text-based searches.

Note that generally, semantic labels as discussed herein facilitate computing distances (e.g., tree-similarity metrics) between trees with different orders of child nodes for corresponding parents, effectively, between two unordered trees.

Serialization of trees for future use may conserve computing resources by obviating the need to re-build trees for use cases that have already been processed.

Other method for serialization of tree structures that may result in flattening of the tree structures can be problematic, to the extent that serialized trees using such flattening methods may require reconstitution to their original structures before they can be used by other software applications.

The preferred embodiments and accompanying methods disclosed herein do not require reconstitution and storage before further processing by other software systems, since various embodiments work with non-structured sets of nodes. Accordingly, trees can be serialized into an optimized set of well-indexed relational tables or into text or binary files. An overall process of reading the trees from the storage and computing a distance or tree-similarity metric between them, via use of one or more embodiments discussed herein, can be very efficient, i.e., fast and lightweight.

FIG. 11 illustrates a table of example Structured Query Language (SQL) computer-code 210, the table of which includes columns defining queries, including a first query 212 (Query 1) and a second query 214 (Query 2), which may be considered trees for the purposes of comparison in accordance with various embodiments discussed herein.

The first query 212 includes a first SELECT clause (or section) 214, first FROM clause 216, a first WHERE clause 218, and a first AND clause 220. Similarly, the second query 222 includes a second SELECT clause 224, a second FROM clause 226, a second WHERE clause 228, and a second AND clause 230.

Note that various clauses, i.e., SELECT clauses 214, 224, FROM clauses 216, 226, WHERE clauses 218, 228, and AND clauses 220, 230, include elements (also called expressions herein), which may be considered childe nodes of the associated clauses.

Note that respective elements of the first SELECT clause 214 are similar to the corresponding elements of the second SELECT clause 214, but exhibit different orders. The elements for each SELECT clause 214, 224, represent sibling nodes. Various embodiments discussed herein, which can discard "order of sibling" information can readily detect that the first SELECT clause 214 matches the second SELECT clause 224, as "order of sibling" information is removed, yet tree-structure information is maintained.

Accordingly, a pairwise comparison of the first SELECT clause 214 and the second SELECT clause 224 using a metric function (also called distance function herein) will provide a high similarity score, i.e., will indicate that the distance between the SELECT clauses 214, 224 is effectively zero, and the similarity metric (if the similarity metric is a distance metric) will be effectively minimum, depending upon the chosen metric function. Note that by convention, smaller distance values indicate closer (or more similar) entities. Furthermore, note that embodiments are not limited to use of metric functions that compute standard set distances.

Similarly, a pairwise comparison of the first FROM clause 216 may register as matching the second FROM clause 226, even though the sibling nodes (e.g., EMPLOYEES E, DEPARTMENTS D) or fragments appear in different orders as siblings of the respective FROM clauses 216, 226.

Pairwise comparisons of the WHERE clauses 218, 228 and the AND clauses 220, 230 may yield small similarity scores/metrics or large distance scores/metrics.

Comparisons of the entire tree structures, e.g., corresponding to the first query 212 and the second query 222, will account for similarities and differences between the nodes 214-220 of the first query 212 and corresponding nodes 224-230 of the second query 222, so as to compute an over tree-similarity metric or distance metric.

Note what various scientific and technical problems can best be modeled by unordered trees. For example, a search or comparison of SQL clauses (as exemplified in FIG. 11) that are syntactically different but semantically identical or similar may demand support for modeling trees as having unordered siblings, i.e., represented as sets (which, when serialized are called serialized trees or set representations of trees herein).

For certain scientific or technical problems, some sections of trees may be considered less important than the others.

Such applications may wish to ignore large differences between some corresponding tree sections, as long as other, more important sections remain close (i.e., similar, or exhibit small distance metrics).

Certain embodiments discussed herein can be readily extended to the splitting of input trees into subtrees. The subtrees can then be compared pairwise, so as to compute pairwise distances (or similarity metrics) between respective tree sections or parts (e.g., which may include subtrees, individual nodes, etc.).

FIG. 12 illustrates two example trees 240, 250, which have subtrees 242-246, and 252-256, respectively, which have been partitioned in preparation for pairwise comparison operations in accordance with various embodiments discussed herein. The collections of subtrees 242-246, and 252-256 are called tree forests.

The two example trees 240, 250 include a first partitioned tree 240 and a second partitioned tree 250. The first partitioned tree 240 includes a first subtree (1a) 242, a second subtree (2a) 244, and a third sub tree (3a) 246. The second partitioned tree 250 has been partitioned into a first subtree (1b) 252, a second sub tree (2b) 254, and a third sub tree (3b) 256.

The first subtree (1a) 242 of the first tree 240 is to be compared with the first subtree (1b) 252 of the second tree 250. The second subtree (2a) 244 of the first tree 240 is to be compared with the second subtree (2b) 254 of the second tree 250. The third subtree (3a) 246 of the first tree 240 is to be compared with the third subtree (3b) 256 of the second tree 250.

Distance metrics or tree-similarity metrics for the pairs may then be summed and/or otherwise selectively combined into an overall distance metric or tree-similarity metric that provides an indicator as to how different or similar the first partitioned tree 240 is to the second partitioned tree 250.

Note that each of the pairwise comparisons between corresponding subtrees of the first tree 240 and the second tree 250 may be selectively weighted in accordance with predetermined importance weights or factors, so as to tailor the resulting metrics to the needs of a given implementation, as discussed more fully below with reference to FIG. 13.

FIG. 13 illustrates an example of a pairwise comparison operation 270 using the subtrees 242-246, 252-256 of FIG. 12, in addition to use of selectively applied weights 266-270, or importance scores, to particular comparison operations corresponding to the pairwise groupings 260-262.

The comparison operation 270 involves accounting for pairwise distances between forests of weighted trees, or between forests of trees where the distance metrics for each pairwise comparison are selectively weighted in accordance with a predetermined importance factor, selected to meet the needs of a given implementation. This type of comparison operation 270 has shown to significantly improve precision and effectiveness of comparison operations for certain tasks.

Each of the subtree groupings 260-262 of subtrees to be compared may be serialized and compared using similar or different metric functions, resulting in output distance metrics. Respective weights 266-270 may be applied to the respective distance metrics. Application of the respective weights 266-270 may involve simple multiplication, such that the weights act as importance scaling factors. Note that other operations, other than multiplication, may be used to apply the weights 266-270 to the respective un-weighted metric function outputs.

The resulting weighted metrics may then be input in to a metric combining function to selectively combine the weighted metrics. An example of a combining function is a linear combination of the respective metrics and the respective unweighted metrics, i.e., a sum of the resulting weighted metrics.

Furthermore, note that while, in the present example embodiment, the weights 266-270 are applied to metric function outputs, that instead, the weights may be applied to serialized versions of the trees 242, 252; 244, 254; 246, 256, without departing from the scope of the present teachings.

In summary, for certain scientific or technical problems, some sections (e.g., subtrees) of trees may be considered less important than the others. A given implementation may accept large differences in these sections, as long as other (more important) pieces remain relatively close, i.e., similar (e.g., as measured by tree-similarity metrics or distance metrics).

An importance factor (e.g., corresponding to the weights 266-270) of subtrees can be adjusted by assigning weights $0 \le w_i \le 1$; $\Sigma_i w_i = 1$. The resulting distance between the original trees can further be computed by combining pairwise distances with their weights. This embodiment has been successfully implemented and tested, and resulted in observations of key similarities between trees being compared, where the similarities may have otherwise gone unnoticed.

The present example embodiment is useful for conducting searches, e.g., mass searches of subtrees inside of other trees. This is enabled or enhanced by the ability to compare and search for similarities of subtrees within a given overall tree.

Hence, a given tree can be split into a forest (of subtrees), and the subtrees can be compared, enabling enhanced tree-comparison operations that account for varying importance of different subtrees, as determined by the needs of a given application or implementation.

FIG. 14 illustrates a first example table 280 with example weights to be applied to different types of clauses 282 of a particular set of computer code, e.g., Structured Query Language (SQL) code. The first example table 280 shows subtree weights for different classes of mergeable SQL query blocks.

For instance, in the present specific example, for a SELECT clause (also called statement), child nodes or sections corresponding to Inline Views 284 are given a weight of "1"; child nodes or sections corresponding to UNION blocks 286 are given a weight of "1"; child nodes or sections corresponding to Scalar Subqueries 288 are given a weight of "0," and so on, so as to meet the needs of a given implementation.

When searching for mergeable query blocks, some parts of the code are more important than the others. For inline views or UNION blocks, similarity of FROM and WHERE clauses may be relatively more important, while for correlated scalar subqueries, the importance may shift toward SELECT and FROM clauses.

The precision of the comparison methods discussed herein can be improved significantly for some applications or implementations, by splitting the original parse tree into a forest of subtrees and assigning each subtree of the forest weights according to their importance for a given task. For two trees, distances between their constituent subtrees may then then measured or computed pairwise (e.g., SELECT subtree of Tree 1 with SELECT subtree of Tree 2 and so on). Finally the pairwise distances may be further combined with their weights to produce a resulting overall distance metric or tree-similarity metric or score.

FIG. 15 illustrates a second example table 300, with results of example comparison calculations, e.g., similarity metrics, scores, and/or distance computations, based on the weights of FIG. 14 and in accordance with a predetermined metric function. The second example table includes a listing of trees used 302, computation distance (e.g., distance metric or tree-similarity metric), threshold value 306, and pass or fail 308.

The second example table 300, two query blocks (Entire trees and WHERE sub trees) were determined as not mergeable when using one comparison method. However, for Inline Views, WHERE clauses can be less important for the property of mergeability. If the importance weight(s) associated with WHERE clauses are sufficiently reduced, such that the importance associated with WHERE subtree comparisons plays less of a factor in the overall tree comparison result, then the "Entire trees" row of the trees used column 302 may instead indicate a PASS instead of a FAIL, i.e., may indicate that in fact, the trees are mergeable.

When using an enhanced tree-forest comparison method, as illustrated in FIG. 13, the pairwise distances (i.e., indicated by distance metrics) between SELECT and FROM subtrees fell below the threshold value (0.3), and both query blocks will be reported as candidates for a merge.

Figure 16:
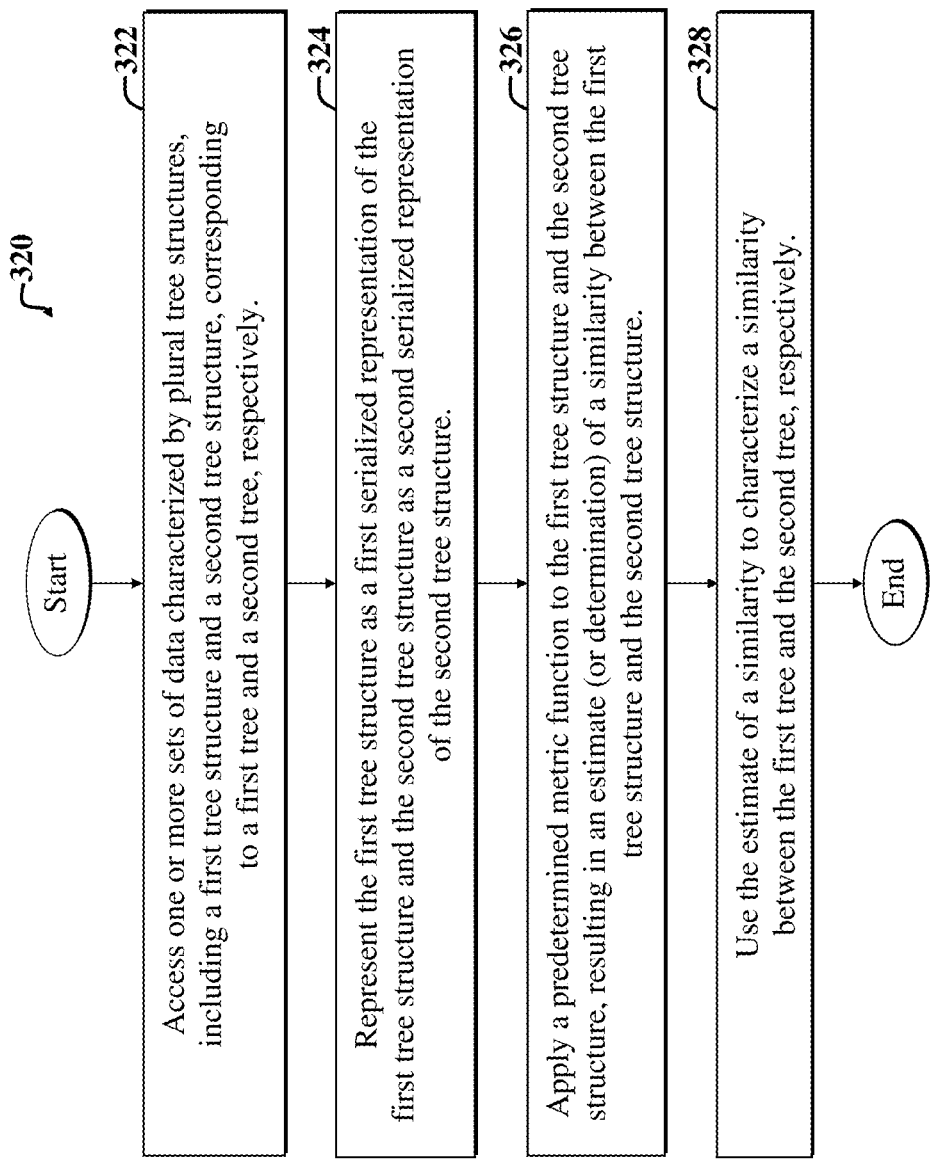
FIG. 16 is a flow diagram of a first example method that is suitable for use with the embodiments of FIGS. 1-15.

FIG. 16 is a flow diagram of a first example method 320 that is suitable for use with the embodiments of FIGS. 1-15. The first example method 320 facilitates determining similarities (and/or differences) among hierarchically structured data, i.e., trees.

An initial tree-accessing step 322 includes accessing one or more sets of data characterized by plural tree structures, including a first tree structure and a second tree structure, corresponding to a first tree and a second tree, respectively. The sets of data may include, for instance, the computer code of FIG. 34, the first example tree 80 of FIG. 3, and the second example tree 110 of FIG. 4.

Next, a tree-serializing step 324 includes representing the first tree structure as a first serialized representation of the first tree structure and the second tree structure as a second serialized representation of the second tree structure. This involves serialization of the first tree structure, e.g., as illustrated in FIG. 3, and serialization of the second tree structure, e.g., as illustrated in FIG. 4.

Subsequently, a metric-function step 326 includes applying a predetermined metric function (e.g., the metric function(s) 150 of FIG. 7) to the first serialized representation of the first tree structure (e.g. corresponding to the first serialized set (X1) 108 of FIG. 7) and the second serialized representation of the second tree structure (e.g., corresponding to the second serialized set (X2) 136 of FIG. 7) resulting in an estimate (or determination) of a similarity (e.g., corresponding to the tree-similarity metric 156 output from the metric function 150 of FIG. 7) between the first tree structure and the second tree structure.

Note that applying a metric function to two serialized tree structures (which are represented as sets) may mean that the two serialized tree structures are provided as input to the metric function, which produces a distance metric or tree-similarity score as output in response thereto.

Finally, a metric-using step 328 includes using the estimate of a similarity (e.g., corresponding tree-similarity metric, distance metric, etc.) to characterize a similarity between the first tree and the second tree, respectively. Note that in certain embodiments, tree-similarity metrics need not be based on tree structural data alone.

Note that the method 320 may be modified, without departing from the scope of the present teachings. For instance, the method 320 may me adjusted to specify that the first tree structure and the second tree structure are part of larger tree structures.

Note that different applications and implementations of embodiments discussed herein may demand efficient mechanisms to compare trees and their associated structures and data; thereby determining similarities, differences, and so on.

The ability to find the similarities and differences can be particularly useful for applications, such as computer code optimization, efficient resource allocation in cloud-based computing environments, data centers, and even low-level hardware optimization for code execution, e.g., for selecting which Graphics Processing Unit (GPU) to run a particular piece of code given the hierarchical structure of the code and the nature of any associated concurrent computing application.

Figure 17:
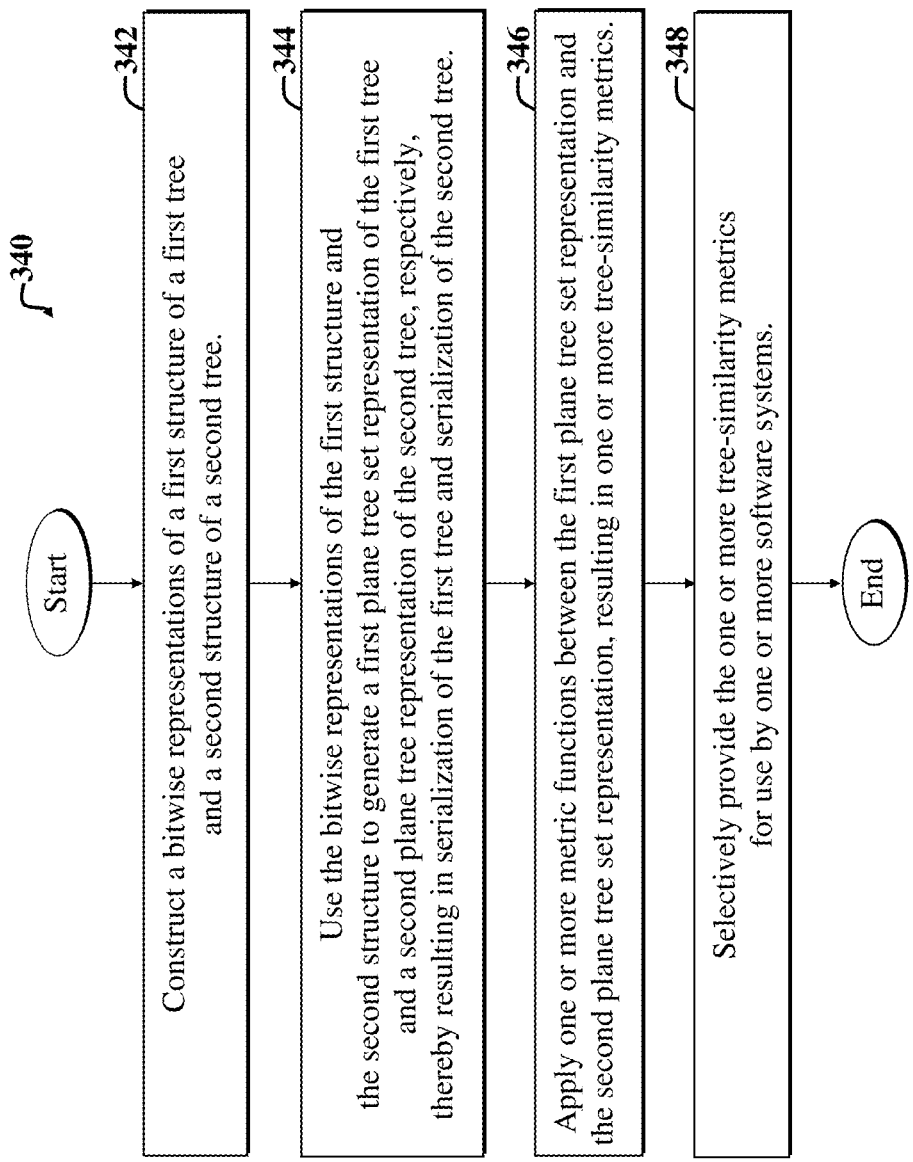
FIG. 17 is a flow diagram of a second example method that is suitable for use with the embodiments of FIGS. 1-16.

FIG. 17 is a flow diagram of a second example method 340 that is suitable for use with the embodiments of FIGS. 1-16. The second example method facilitates determining similarities (e.g., as indicated by distance metrics or tree-similarity metrics) among hierarchically structured data, i.e., trees characterized by tree structures.

An initial tree-serialization step 342 includes constructing a bitwise representation of a first structure of the first tree (i.e., a serialized version of the structure of the first tree) and a second structure of the second tree (i.e., a serialized version of the structure of the second tree). The serialized versions of the first tree structure and second tree structure may correspond to or include, for instance, the node metadata 104 of the second grandchild node 92 of FIG. 3, and the node metadata 102 of the first grandchild node 90 of FIG. 4.

A subsequent tree-serialization step 344 includes using the bitwise representations of the first structure and the second structure to generate a first set representation of the first tree and a second set representation of the second tree, respectively, thereby resulting in serialization of the first tree and serialization of the second tree.

Note that use of serialized tree structures (i.e., set representations) as discussed herein facilitate so-called semantic searches, as discussed more fully above, e.g., with reference to FIG. 1.

Next, a metric function step 346 includes applying one or more metric functions (e.g., corresponding to the metric function(s) of FIG. 7) between the first set representation (e.g., corresponding to the first serialized set (X1) 108 of FIG. 7) and the second set representation (e.g., corresponding to the second serialized set (X2) 136 of FIG. 7), resulting in one or more tree-similarity metrics (e.g., corresponding to the tree-similarity metrics or scores 156 of FIG. 7).

Finally, a metric providing step 348 includes selectively providing the one or more tree-similarity metrics for use by one or more software systems (e.g., the software systems 12 of FIGS. 1 and 2).

Figure 18:
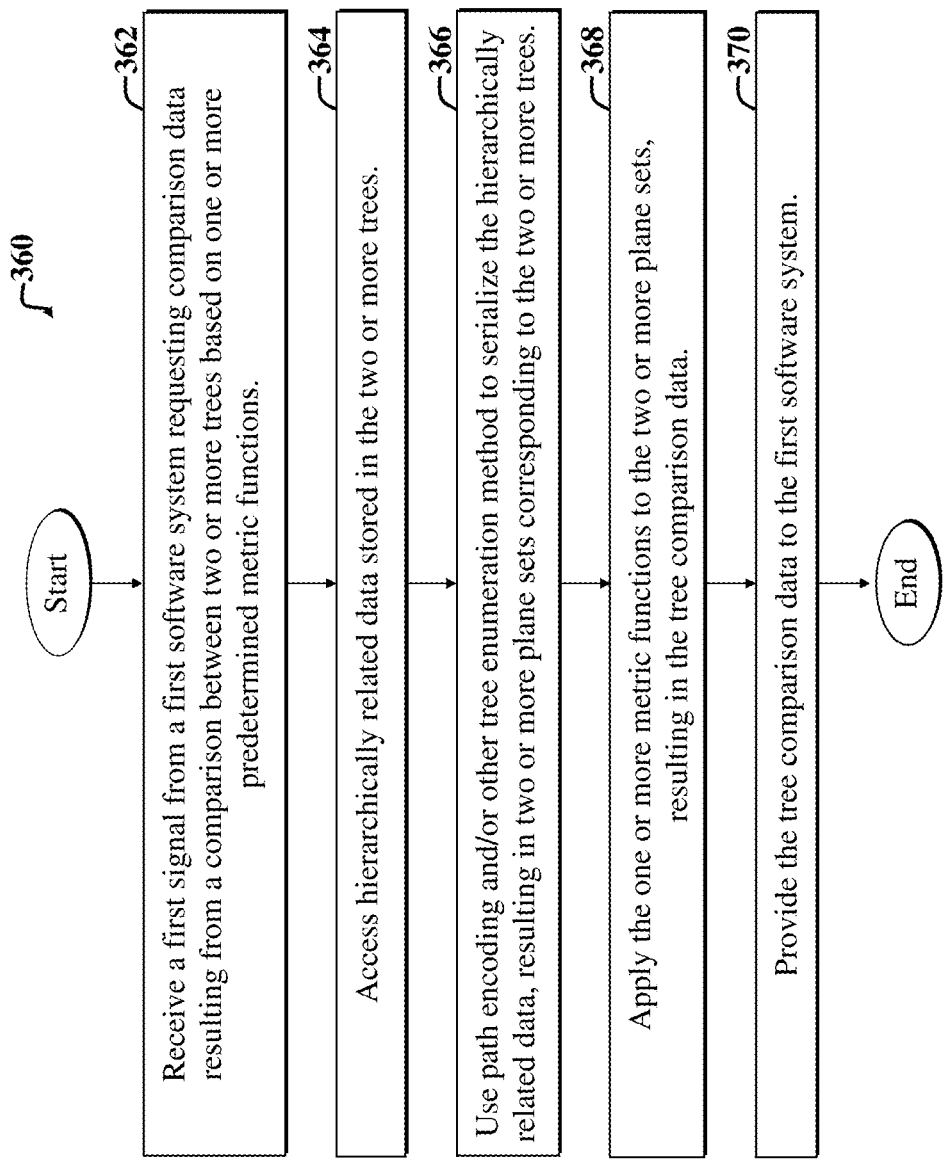
FIG. 18 is a flow diagram of a third example method that is suitable for use with the embodiments of FIGS. 1-17.

FIG. 18 is a flow diagram of a third example method 360 that is suitable for use with the embodiments of FIGS. 1-17. The third example method 360 facilitates characterizing similarities between two or more trees.

An initial signal-receiving step 362 includes receiving (e.g., by the tree software 16 of FIG. 1) a first signal from a first software system (e.g., a software system of the software systems 12 of FIGS. 1 and 2) requesting comparison data resulting from a comparison between two or more trees based on one or more predetermined metric functions;

Next, a tree-accessing step 364 includes accessing hierarchically related data (e.g., trees, such as represented, in one example, at least in part, by the computer code 34 of FIG. 2) stored in the two or more trees.

Subsequently, a path-encoding step 366 includes using path encoding (e.g., tree structure serialization using an enumeration method, as discussed above with reference to FIG. 3) to serialize the hierarchically related data, resulting in two or more serialized trees (e.g., representing the first serialized set (X1) of FIG. 3 and the second serialized set (X2) of FIG. 4, respectively), also called set representations herein, corresponding to the two or more trees (e.g., corresponding to the first example tree 80 of FIG. 3 and the second example tree 110 of FIG. 4).

Accordingly, in the path-encoding step 366, path encoding (and/or other tree enumeration method) is used to serialize the hierarchically related tree structure and any data attributes (as may be need for certain applications or implementations), data, resulting in two or more sets corresponding to serialized versions of the two or more trees.

Next, a metric-function step 368 includes applying the one or more metric functions to the two or more set representations of trees (i.e., serialized trees), resulting in the tree comparison data, i.e., a tree-similarity metric, distance metric, etc.

Finally, a metric-providing step 370 includes providing the tree comparison data the first software system.

Figure 19:
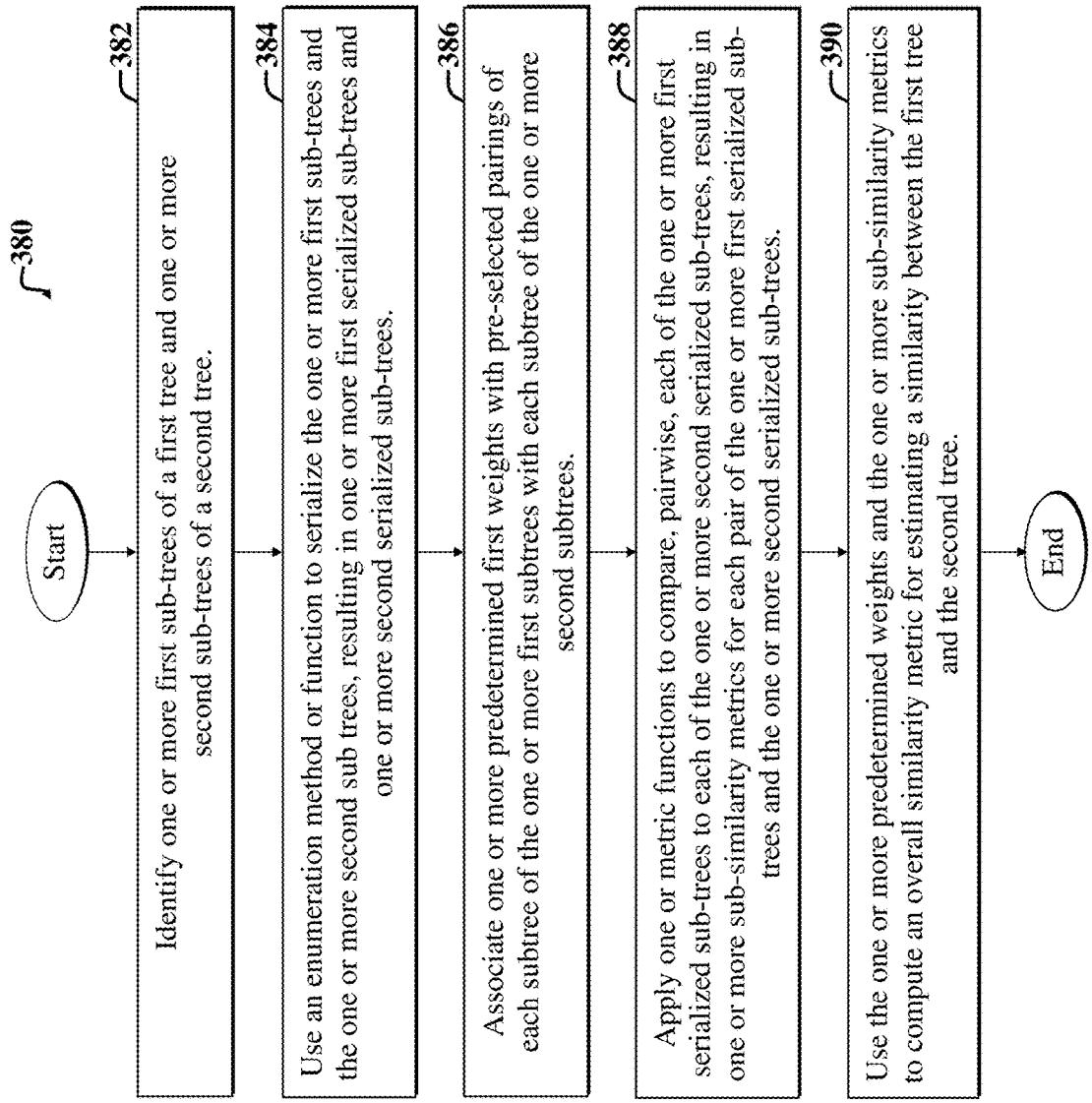
FIG. 19 is a flow diagram of a fourth example method that is suitable for use with the embodiments of FIGS. 1-18.

FIG. 19 is a flow diagram of a fourth example method 380 that is suitable for use with the embodiments of FIGS. 1-18. The method 380 facilitates comparing forests of trees to facilitate enhanced tree-comparison operations that can be more specifically tailored to specific comparison priorities for a given application or implementation.

An initial identifying step 382 includes identifying one or more first subtrees (e.g., subtrees 242-246 of FIG. 12) of a first tree (e.g., the first partitioned tree 240 of FIG. 12) and one or more second subtrees (e.g., sub-tree 252-256 of FIG. 12) of a second tree (e.g., the second partitioned tree 250 of FIG. 12).

Next, a tree serialization step 384 includes using an enumeration method to serialize the one or more first subtrees and the one or more second sub trees, resulting in one or more first serialized subtrees and one or more second serialized subtrees.

Subsequently, a prioritization step 386 includes associating one or more predetermined first weights (e.g., weights 266-270 of FIG. 13) with pre-selected pairings (e.g., corresponding to pairings indicated by blocks 260-264 of FIG. 13) of each subtree of the one or more first subtrees with each subtree of the one or more second subtrees.

Next, a metric function step 388 includes applying one apply one or metric functions to compare, pairwise, each of the one or more first serialized subtrees to each of the one or more second serialized subtrees, resulting in one or more sub-similarity metrics for each pair (e.g., each of the pairs 260, 262, 264 of FIG. 13) of the one or more first serialized subtrees and the one or more second serialized subtrees.

Finally, an overall comparison metric step 390 includes using the one or more predetermined weights and the one or more sub-similarity metrics to compute an overall similarity metric for estimating a similarity between the first tree and the second tree.

Figure 20:
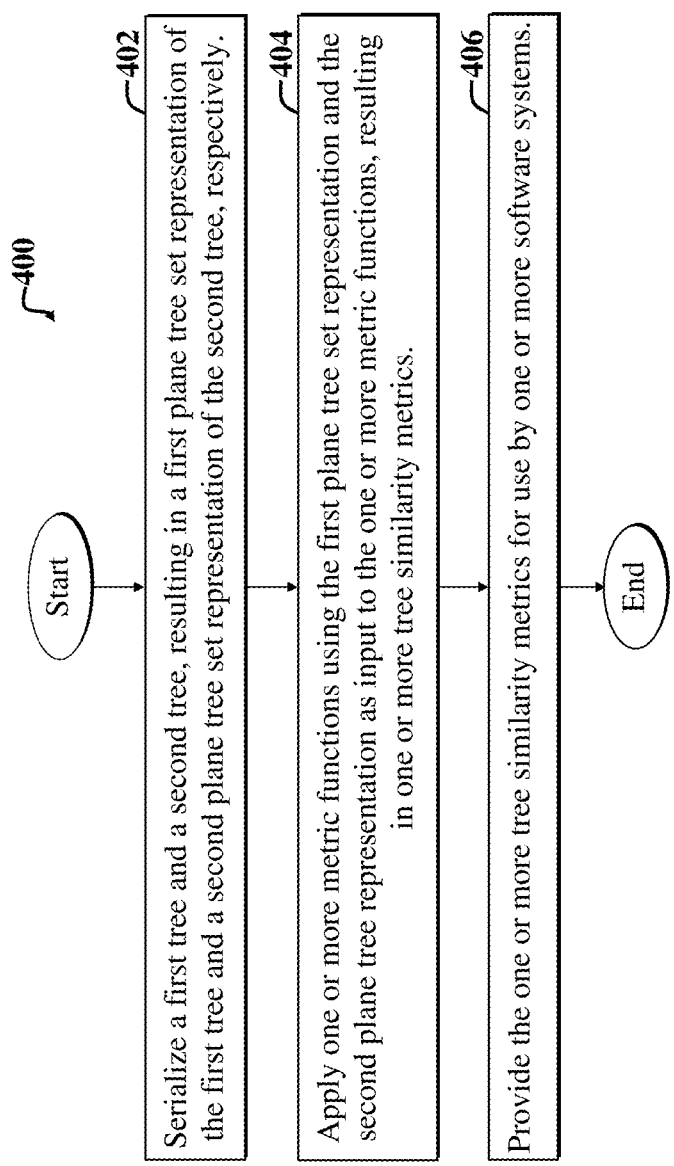
FIG. 20 is a flow diagram of a fifth example method that is suitable for use with the embodiments of FIGS. 1-19.

FIG. 20 is a flow diagram of a fifth example method that is suitable for use with the embodiments of FIGS. 1-19. The fifth example method 400 facilitates determining similarities (e.g., as indicated by distance metrics or tree-similarity metrics) among hierarchically structured data.

A first serializing step 402 includes serializing a first tree and a second tree, resulting in a first set representation of the first tree and a second set representation of the second tree, respectively.

A second metric function step 404 includes applying one or more metric functions using the first set representation and the second set representation as input to the one or more metric functions, resulting in one or more tree-similarity metrics as output from the one or more metric functions.

A third step 406 includes selectively providing the one or more tree-similarity metrics for use by one or more software systems, e.g., the software system(s) 12 of FIGS. 1 and 2.

Note that the various methods discussed herein may be modified, without departing from the scope of the present teachings. For instance, the fifth example method 400 may further specify that the one or more software systems include(s) an Artificial Intelligence (AI) engine and/or other server-side software of a cloud-based computing environment.

The other server-side software may include BI (Business Intelligence), Customer Relationship Management (CRM), and/or other enterprise software.

The one or more software systems (e.g., corresponding to the software systems 12 of FIGS. 1 and 2) may further include a software analyzer and a code parser. The software analyzer may be tailored for analyzing SQL code.

The one or more software systems may further include a code optimizer for facilitating optimizing hierarchically structured computer code. The code optimizer may further implement functionality for facilitating conducting searches of computer code to detect and illustrate code structures that exhibit one or more of the tree-similarity metrics within a predetermined threshold range (e.g., as discussed above with reference to FIG. 2).

The first serializing step 402 may further specify: constructing a bitwise representation of a first structure of the first tree and a second structure of the second tree; and using the bitwise representation of the first structure and the second structure to generate the first set representation of the first tree, and the second flattened tree representation of the second tree, respectively.

In summary, trees are ubiquitous data structures that are widely used in computer science and information technologies industries for different theoretical and practical purposes. Multiple applications seek reliable and versatile methods of establishing, estimating, or determining similarities of trees. Many such applications make additional demands for these methods to be fast and lightweight. Various embodiments discussed herein meet these demands, in part by enabling set operations on serialized representations of tree structures.

Potential uses of various embodiments discussed herein include, but are not limited to parsers of natural and programming languages code optimizers static code analyzers advanced search engines for hierarchical data (Bill of Material applications, Computer Aided Design (CAD) systems, Customer Relationship Management (CRM) platforms, etc.), and so on.

Figure 21:
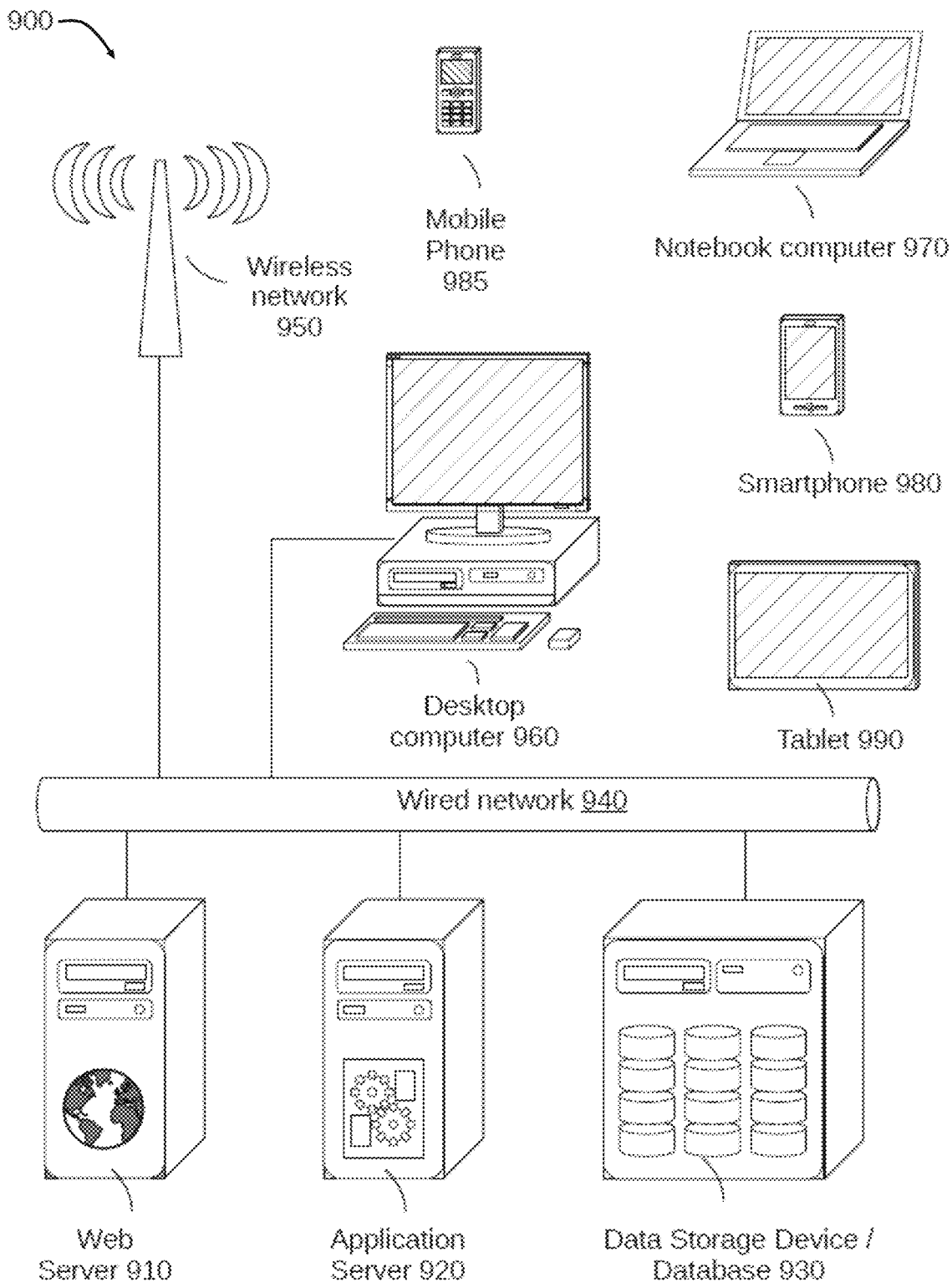
FIG. 21 is a general block diagram of a system and accompanying computing environment usable to implement the embodiments of FIGS. 1-20.

FIG. 21 is a general block diagram of a system 900 and accompanying computing environment usable to implement the embodiments of FIGS. 1-20. Embodiments may be implemented as standalone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computing devices 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 920, web server 910, and optionally database 930 can be combined into a single server computer application and system. In a further embodiment, virtualization and virtual machine applications may be used to implement one or more of the application server 920, web server 910, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1, 2, and 21, the software systems 12 may be implemented via software running on the application server 920 and/or the web server 910 of FIG. 21. The client systems 32 of FIG. 2 may be implemented via one or more of the mobile phone 985, notebook computer 970, smartphone 980, desktop computer 960, or tablet 990 of FIG. 21. The backend database 14 of FIG. 1 may be implemented via the data storage device/database 930 of FIG. 21. The tree software 16 may run on the application server 920 of FIG. 21.

Figure 22:
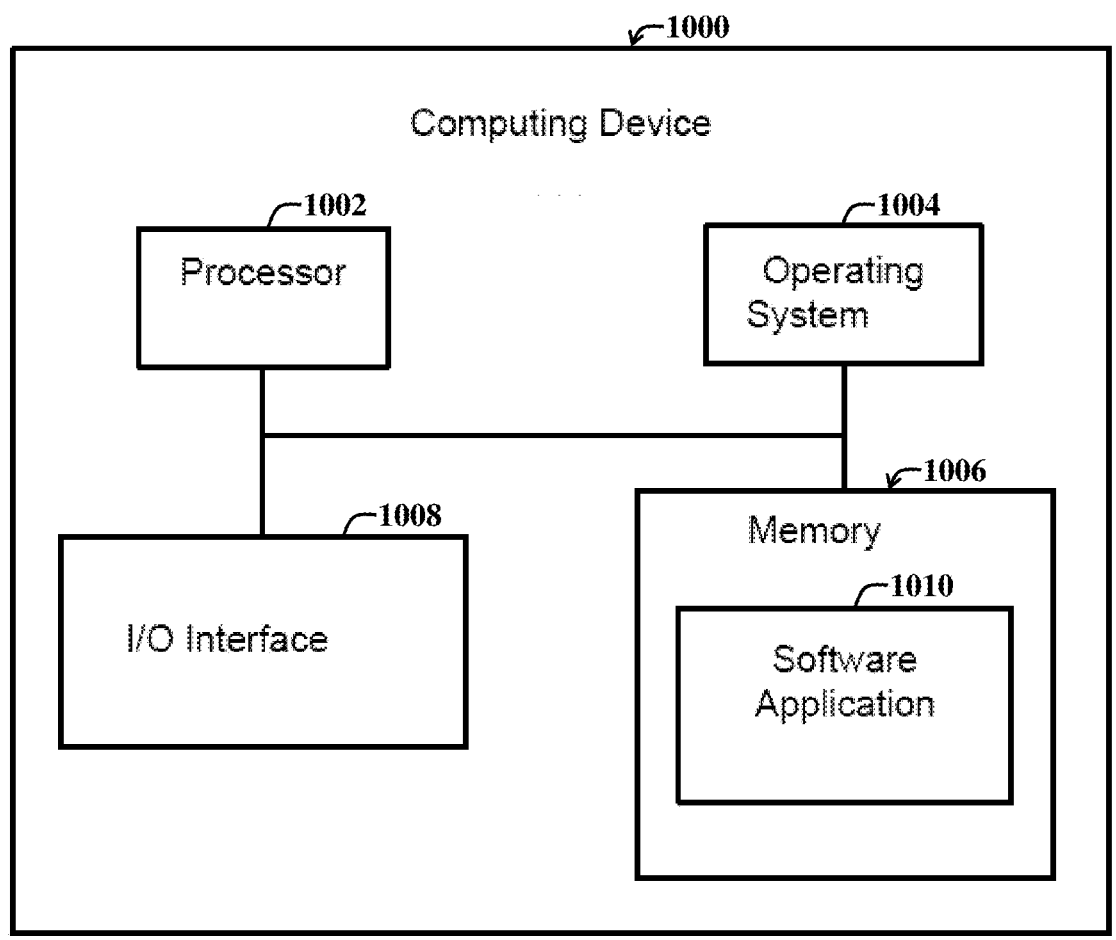
FIG. 22 is a general block diagram of a computing device usable to implement the embodiments of FIGS. 1-21.

FIG. 22 illustrates a block diagram of an example computing device or system 500, which may be used for implementations described herein. For example, the computing device 1000 may be used to implement server devices 910, 920 of FIG. 21 as well as to perform the method implementations described herein. In some implementations, the computing device 1000 may include a processor 1002, an operating system 1004, a memory 1006, and an input/output (I/O) interface 1008.

In various implementations, the processor 1002 may be used to implement various functions and features described herein, as well as to perform the method implementations described herein. While the processor 1002 is described as performing implementations described herein, any suitable component or combination of components of the computing device 1000 or any suitable processor or processors associated with the device 1000 or any suitable system may perform the steps described. Implementations described herein may be carried out on a user device, on a server, or a combination of both.

The example computing device 1000 also includes a software application 1010, which may be stored on memory 1006 or on any other suitable storage location or computer-readable medium. The software application 1010 provides instructions that enable the processor 1002 to perform the functions described herein and other functions. The components of computing device 1000 may be implemented by one or more processors or any combination of hardware devices, as well as any combination of hardware, software, firmware, etc.

For ease of illustration, FIG. 22 shows one block for each of processor 1002, operating system 1004, memory 1006, I/O interface 1008, and software application 1010. These blocks 1002, 1004, 1006, 1008, and 1010 may represent multiple processors, operating systems, memories, I/O interfaces, and software applications. In various implementations, the computing device 1000 may not have all of the components shown and/or may have other elements including other types of components instead of, or in addition to, those shown herein.

Although the description has been described with respect to particular embodiments thereof, these particular embodiments are merely illustrative, and not restrictive. For instance, certain embodiments discussed herein are particularly applicable to code optimization of use by software developers to analyze and improve code, embodiments are not limited thereto. For instance, virtually any software system, e.g., compliers, parsers, Artificial Intelligence (AI) algorithms and associated neural nets, and so on, that operate on hierarchically related data, can benefit through enhanced abilities to ascertain, measure, prioritize, etc., similarities of tree structures, as afforded by various embodiments discussed herein.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A non-transitory tangible processor-readable medium including instructions executable by one or more processors, and when executed configured to perform operations comprising:
    parsing a first tree of a first section of a computer code into a plurality of subtrees including a first subtree and a second subtree, wherein at least one of the first subtree and the second subtree includes potentially problematic or redundant code sections of the computer code;
    parsing a second tree of a second section of the computer code, into a plurality of subtrees including a third subtree and a fourth subtree, wherein at least one of the third subtree and the fourth subtree includes potentially problematic or redundant code sections of the computer code;
    serializing the first subtree to form a first serialized data structure and the second subtree to form a second serialized data structure of the first tree and the third subtree to form a third serialized data structure and the fourth subtree to form a fourth serialized data structure of the second tree by stripping information pertaining to order of sibling nodes and by applying an enumeration method using metadata describing the respective first subtree, second subtree, third subtree, and fourth subtree;
    grouping the first serialized data structure and the third serialized data structure into at least a first group, and grouping the second serialized data structure and the fourth serialized data structure into a second group;
    applying one or more metric functions for pairwise comparisons of semantics of the first serialized data structure with the third serialized data structure of the first group and semantics of the second serialized data structure with the fourth serialized data structure of the second group without regard to sibling order resulting in one or more pairwise metrics;
    applying the one or more pairwise metrics to the first group and the second group, resulting in one or more tree-similarity metrics indicating a structural organization similarity and/or difference of the first tree and the second tree;
    selectively providing the one or more tree-similarity metrics to one or more software systems by selecting from a group of tree-similarity metrics, the one or more tree-similarity metrics meeting a similarity threshold; and
    optimizing the computer code by using the one or more tree-similarity metrics to conduct a search of the computer code and to identify and address one or more problematic or redundant code sections of the computer code in enhancing functionality and/or efficiency of the one or more software systems.

2. The non-transitory tangible processor-readable medium of claim 1, wherein the one or more software systems includes an Artificial Intelligence (AI) engine.

3. The non-transitory tangible processor-readable medium of claim 1, wherein the one or more software systems includes BI (Business Intelligence) software.

4. The non-transitory tangible processor-readable medium of claim 1, wherein the one or more software systems includes a software analyzer.

5. The non-transitory tangible processor-readable medium of claim 4, wherein the software analyzer includes a code parser.

6. The non-transitory tangible processor-readable medium of claim 4, wherein the software analyzer includes an analyzer for analyzing SQL (Structured Query Language).

7. The non-transitory tangible processor-readable medium of claim 1, wherein the one or more software systems includes a code optimizer for facilitating the optimizing of the computer code.

8. The non-transitory tangible processor-readable medium of claim 7, wherein the code optimizer includes computer optimizing code for facilitating conducting searches of the computer code to detect and illustrate code structures that exhibit one or more of the one or more tree-similarity metrics that meet the similarity threshold.

9. The non-transitory tangible processor-readable medium of claim 1, wherein serializing further includes:
constructing a bitwise representation of a first structure of the first tree and a second structure of the second tree; and
using the bitwise representation of the first structure and the second structure to generate the first serialized data structure and the second serialized data structure of the first tree, and the third serialized data structure and the fourth serialized data structure of the second tree, respectively.

10. The non-transitory tangible processor-readable medium of claim 1, wherein applying one or more metric functions comprises:
associating the first group with a first group weight and associating the second group with a second group weight,
wherein applying the one or more metric functions includes applying the first group weight and the second group weight.

11. A method for facilitating determining similarities among hierarchically structured data, the method comprising:
parsing a first tree of a first section of a computer code into a plurality of subtrees including a first subtree and a second subtree, wherein at least one of the first subtree and the second subtree includes potentially problematic or redundant code sections of the computer code;
parsing a second tree of a second section of the computer code, into a plurality of subtrees including a third subtree and a fourth subtree, wherein at least one of the third subtree and the fourth subtree includes potentially problematic or redundant code sections of the computer code;
serializing the first subtree to form a first serialized data structure and the second subtree to form a second serialized data structure of the first tree and the third subtree to form a third serialized data structure and the fourth subtree to form a fourth serialized data structure of the second tree by stripping information pertaining to order of sibling nodes and by applying an enumeration method using metadata describing the respective first subtree, second subtree, third subtree, and fourth subtree;
grouping the first serialized data structure and the third serialized data structure into at least a first group, and grouping the second serialized data structure and the fourth serialized data structure into a second group;
applying one or more metric functions for pairwise comparisons of semantics of the first serialized data structure with the third serialized data structure of the first group and semantics of the second serialized data structure with the fourth serialized data structure of the second group without regard to sibling order resulting in one or more pairwise metrics;
applying the one or more pairwise metrics to the first group and the second group, resulting in one or more tree-similarity metrics indicating a structural organization similarity and/or difference of the first tree and the second tree;
selectively providing the one or more tree-similarity metrics to one or more software systems by selecting from a group of tree-similarity metrics, the one or more tree-similarity metrics meeting a similarity threshold; and
optimizing the computer code by using the one or more tree-similarity metrics to conduct a search of the computer code and to identify and address one or more problematic or redundant code sections of the computer code in enhancing functionality and/or efficiency of the one or more software systems.

12. The method of claim 11, wherein the one or more software systems includes an Artificial Intelligence (AI) engine.

13. The method of claim 11, wherein the one or more software systems includes BI (Business Intelligence) software.

14. The method of claim 11, wherein the one or more software systems includes a software analyzer.

15. The method of claim 14, wherein the software analyzer includes a code parser.

16. The method of claim 14, wherein the software analyzer includes an analyzer for analyzing SQL (Structured Query Language).

17. The method of claim 11, wherein the one or more software systems includes a code optimizer for facilitating the optimizing of the computer code, and where the code optimizer includes computer optimizing code for facilitating conducting searches of the computer code to detect and illustrate code structures that exhibit one or more of the one or more tree-similarity metrics that meet the similarity threshold.

18. The method of claim 11, wherein serializing further includes:
constructing a bitwise representation of a first structure of the first tree and a second structure of the second tree; and
using the bitwise representation of the first structure and the second structure to generate the first serialized data structure and the second serialized data structure of the first tree, and the third serialized data structure and the fourth serialized data structure of the second tree, respectively.

19. The method of claim 11, wherein applying one or more metric functions comprises:
associating the first group with a first group weight and associating the second group with a second group weight,
wherein applying the one or more metric functions includes applying the first group weight and the second group.

20. An apparatus comprising:
one or more processors; and
logic encoded in one or more non-transitory tangible processor-readable media for execution by the one or more processors and when executed configured to perform operations comprising:

parsing a first tree of a first section of a computer code into a plurality of subtrees including a first subtree and a second subtree, wherein at least one of the first subtree and the second subtree includes potentially problematic or redundant code sections of the computer code;

parsing a second tree of a second section of the computer code, into a plurality of subtrees including a third subtree and a fourth subtree, wherein at least one of the third subtree and the fourth subtree includes potentially problematic or redundant code sections of the computer code;

serializing the first subtree to form a first serialized data structure and the second subtree to form a second serialized data structure of the first tree and the third subtree to form a third serialized data structure and the fourth subtree to form a fourth serialized data structure of the second tree by stripping information pertaining to order of sibling nodes and by applying an enumeration method using metadata describing the respective first subtree, second subtree, third subtree, and fourth subtree;

grouping the first serialized data structure and the third serialized data structure into at least a first group, and grouping the second serialized data structure and the fourth serialized data structure into a second group;

applying one or more metric functions for pairwise comparisons of semantics of the first serialized data structure with the third serialized data structure of the first group and semantics of the second serialized data structure with the fourth serialized data structure of the second group without regard to sibling order resulting in one or more pairwise metrics;

applying the one or more pairwise metrics to the first group and the second group, resulting in one or more tree-similarity metrics indicating a structural organization similarity and/or difference of the first tree and the second tree;

selectively providing the one or more tree-similarity metrics to one or more software systems by selecting from a group of tree-similarity metrics, the one or more tree-similarity metrics meeting a similarity threshold; and optimizing the computer code by using the one or more tree-similarity metrics to conduct a search of the computer code and to identify and address one or more problematic or redundant code sections of the computer code in enhancing functionality and/or efficiency of the one or more software systems.

* * * * *

UNITED STATES PATENT AND TRADEMARK OFFICE
CERTIFICATE OF CORRECTION

PATENT NO. : 12,332,861 B2
APPLICATION NO. : 17/834846
DATED : June 17, 2025
INVENTOR(S) : Perkov Page 1 of 1

It is certified that error appears in the above-identified patent and that said Letters Patent is hereby corrected as shown below:

In the Specification

In Column 17, Line 52, delete "in in" and insert -- in --, therefor.

In Column 19, Line 54, delete "{|" and insert -- max{| --, therefor.

In Column 19, Line 54, delete "[2]" and insert -- [3] --, therefor.

In Column 19, Line 56, after "$x_j$}" insert -- [4] --, therefor.

In Column 26, Line 61, delete "functions;" and insert -- functions. --, therefor.

In the Claims

In Column 34, Line 37, in Claim 17, delete "where" and insert -- wherein --, therefor.

Signed and Sealed this
Seventh Day of October, 2025

John A. Squires
*Director of the United States Patent and Trademark Office*